United States Patent
Nakajima et al.

(10) Patent No.: US 9,019,831 B2
(45) Date of Patent: Apr. 28, 2015

(54) NETWORK REPEATER, QOS CONTROL METHOD AND STORAGE MEDIUM STORING QOS CONTROL PROGRAM

(75) Inventors: Hiroaki Nakajima, Tokyo (JP); Yoshitaka Nakao, Tokyo (JP); Satoshi Sonobe, Tokyo (JP); Shunichi Kumagai, Tokyo (JP); Hideyuki Muto, Tokyo (JP)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 13/697,285

(22) PCT Filed: Apr. 27, 2011

(86) PCT No.: PCT/JP2011/060686
§ 371 (c)(1),
(2), (4) Date: Nov. 9, 2012

(87) PCT Pub. No.: WO2011/142328
PCT Pub. Date: Nov. 17, 2011

(65) Prior Publication Data
US 2013/0070600 A1  Mar. 21, 2013

(30) Foreign Application Priority Data
May 13, 2010 (JP) ................................ 2010-110920

(51) Int. Cl.
*H04L 1/00* (2006.01)
*H04L 12/26* (2006.01)
(Continued)

(52) U.S. Cl.
CPC .............. *H04L 47/522* (2013.01); *H04L 47/12* (2013.01); *H04L 47/24* (2013.01); *H04L 47/762* (2013.01); *H04L 47/805* (2013.01); *H04L 47/822* (2013.01)

(58) Field of Classification Search
CPC ..... H04L 47/10; H04L 47/30; H04L 12/5695; H04L 47/22; H04L 12/5602; H04L 12/5636; H04L 47/2441

USPC .................................................. 370/229–235
See application file for complete search history.

(56) References Cited

U.S. PATENT DOCUMENTS

| 5,838,690 A | 11/1998 | Kano et al. |
| 6,212,162 B1 | 4/2001 | Horlin |

(Continued)

FOREIGN PATENT DOCUMENTS

| CN | 1183189 A | 5/1998 |
| JP | 9-135263 A | 5/1997 |

(Continued)

OTHER PUBLICATIONS

Extended European Search Report, Dec. 2, 2013, issued by the European Patent Office in counterpart European Application No. 11780585.3.

(Continued)

*Primary Examiner* — Ronald B Abelson
(74) *Attorney, Agent, or Firm* — Sughrue Mion, PLLC

(57) ABSTRACT

[Problem]
The problem is to carry out the QoS control which tracks a change in a state of an outward line.
[Means for solving the problem]
A network repeater according to the present invention includes: a flow control means to carry out flow control for restricting inflow of a data flow which is received through an inward line; a bandwidth control means to carry out bandwidth control of controlling a bandwidth of a data flow which is received through the inward line and is sent through an outward line; and an outward line monitoring means to monitor a change in a state of the outward line. In the case that the monitored state of the outward line satisfies a specified condition which is determined in advance, either the flow control or the bandwidth control is carried out on a condition corresponding to the specified condition.

17 Claims, 19 Drawing Sheets

(51) Int. Cl.
  *H04L 12/873* (2013.01)
  *H04L 12/801* (2013.01)
  *H04L 12/851* (2013.01)
  *H04L 12/923* (2013.01)
  *H04L 12/927* (2013.01)
  *H04L 12/911* (2013.01)

(56) References Cited

U.S. PATENT DOCUMENTS

| | | | |
|---|---|---|---|
| 6,771,661 | B1 | 8/2004 | Chawla et al. |
| 2002/0150117 | A1 | 10/2002 | Baba |
| 2004/0038685 | A1 | 2/2004 | Nakabayashi |
| 2007/0064604 | A1 | 3/2007 | Chen et al. |
| 2007/0153921 | A1 | 7/2007 | Nakabayashi |
| 2009/0003212 | A1* | 1/2009 | Kwan et al. .......... 370/235 |
| 2010/0309916 | A1* | 12/2010 | Oskouy et al. .......... 370/392 |

FOREIGN PATENT DOCUMENTS

| | | |
|---|---|---|
| JP | 11-98155 A | 4/1999 |
| JP | 2000-503176 A | 3/2000 |
| JP | 2000-196641 A | 7/2000 |
| JP | 2004-112780 A | 4/2004 |
| JP | 2006-245952 A | 9/2006 |
| JP | 2007-96910 A | 4/2007 |
| JP | 2009-267642 A | 11/2009 |
| WO | 2006/006208 A1 | 1/2006 |

OTHER PUBLICATIONS

International Search Report for PCT/JP2011/060686 dated Aug. 9, 2011.

Communication dated Nov. 4, 2014 from the State Intellectual Property Office of the People's Republic of China in counterpart application No. 201180023894.0.

* cited by examiner

NETWORK REPEATER, QOS CONTROL METHOD AND STORAGE MEDIUM STORING QOS CONTROL PROGRAM

CROSS REFERENCE TO RELATED APPLICATIONS

This application is a National Stage of International Application No. PCT/JP2011/060686 filed Apr. 27, 2011, claiming priority based on Japanese Patent Application No. 2010-110920 filed May 13, 2010, the contents of all of which are incorporated herein by reference in their entirety.

TECHNICAL FIELD

The present invention relates to a network repeater, a QoS (Quality of Service) control method and a storage medium storing a QoS control program, and in particular relates to a network repeater, a QoS control method and a storage medium storing a QoS control program which carry out the optimum QoS control through tracking a change in a transmission speed on an outward line.

BACKGROUND ART

The QoS control is one of the arts for securing quality of important communication in a network through which various kinds of traffic flow. In other words, the QoS control is the art for carrying out a different process to data, which is carried by the communication through the network, on the basis of a type of the data.

As the QoS control which is carried out in a network repeater such as a router, priority control, bandwidth control and flow control are carried out.

According to the priority control, the network repeater changes an order of transferring packets, which the network repeater outputs to a rear position apparatus (rear side apparatus), according to priority assigned to a packet which the network repeater inputs from a front position apparatus (front side apparatus). That is, according to the priority control, the packet to which the high priority is assigned is transferred preferentially to the rear position apparatus.

According to the bandwidth control, the packet which passes the network repeater is classified per a type of the packet, and a bandwidth which are assigned to each of the types of the packet is controlled. In the case of the bandwidth control for an inward line of the network repeater, an inflow bandwidth restriction is carried out. That is, it is monitored whether traffic, which flows into the network repeater, exceeds a bandwidth which is predetermined on the basis of the type of the packet, and the packet which exceeds the predetermined bandwidth is discarded. Moreover, in the case of the bandwidth control for an outward line of the network repeater, control which occupies or restricts an available bandwidth per the type of the packet within an effective bandwidth of the outward line. That is, the bandwidths of the inward line and the outward line of the network repeater are controlled so as to be distributed or restricted.

According to the flow control, a stagnant state of the buffer inside the network repeater, is monitored, and it is instructed that the front position apparatus should restrict sending the packet in the case that number of the packets, which are stagnated in the buffer exceeds a predetermined threshold value. That is, in the case that number of the packets, which are inputted from the front position apparatus, is increased, the flow control is carried out in order to avoid a situation that the buffer enters into an overflow state and that causes discarding the packet.

As one method to determine the priority of the packet, there is a method to determine the priority on the basis of information on a sending source address or a destination address, or a protocol to be used. In the case of using the address information, the IP (Internet Protocol) address or the MAC (Media Access Control) address are referred to. Moreover, in the case of using the protocol, TCP (Transmission Control Protocol) and UDP (User Datagram Protocol) are used distinctively.

As another method, there is a method to designate the priority explicitly in a field of the packet. In this case, a dedicated field, which designates a priority order of transferring the packet, such as TOS (Type of Service) and DSCP (Differentiated services code point) of the IP header is used. In the case of the layer 2, the TCI (Tag Control Information) field of the VLAN (Virtual Local Area Network) tag is used.

The network repeater identifies the priority of the packet, which is inputted from the front position apparatus, by use of the above-mentioned method. Then, the packet, whose priority is identified, is distributed to an output buffer (or waiting queue) arranged correspondingly to each priority, and waits for being transferred to the rear position apparatus. The packet, which is distributed and accumulated in each output buffer, is read from the output buffer which has the high priority, and is transferred to the rear position apparatus.

There are various methods related to readout control for the output buffer.

One method is that at first, the packet which is in the output buffer having the highest priority is read out, and the packet which is in the output buffer having the next level priority is read out when the output buffer having the highest priority becomes empty. Moreover, there is another method utilizing in which the weight control, even if the packet remains in the output buffer having the high priority, the packet in the output buffer having the low priority is read out at a constant rate. According to the latter method, it is possible to adjust an amount of data which is read out from each output buffer.

In particular, in the case of carrying out the bandwidth control for the outward line, a readout method by CBQ (Class-Based Queuing), which can guarantee number of the sending packets per the type of the packet, is used. According to CBQ, number of the packets, which is desired to be sent in a predetermined time, is determined per a class of communication, and number of the packets, which should be sent from the output buffer arranged per the class of the communication, is set. It is possible to guarantee the number of the packets, which should be transferred, per the class through reading out the packets whose number is corresponding to the number set to each output buffer, when reading out the packet.

Moreover, in the case of the bandwidth control for the outward line, through restricting a rate of reading out the packet per the output buffer, shaping is carried out so that the bandwidth, which exceeds the set value, may not be consumed and the bandwidth may not exceed the effective bandwidth of the outward line of the network apparatus.

With respect to the control method for instructing the front position apparatus to restrict sending the packet in the flow control, there are a method by use of the PAUSE frame in the layer 2 and a method by use of the ACK (Acknowledgement) packet in the layer 3.

The flow control in Ethernet (registered trademark), which IEEE (Institute of Electrical and Electronics Engineers) 802.3 specifies, uses the PAUSE frame which includes information on a time when sending the frame is stopped. When the front position apparatus receives the PAUSE frame which designates the time when sending the frame is stopped, the front position apparatus stops sending data from the time when receiving the PAUSE frame until the time designated by the PAUSE frame.

Moreover, the flow control in TCP/IP (Transmission Control Protocol/Internet Protocol) uses the ACK packet. In the case of instructing the data-sending source apparatus to restrict sending the packet, the network repeater embeds the window size, which indicates an amount of the receivable data, in the ACK packet and notifies the data-sending source apparatus of the window size through sending the ACK packet to the sending source apparatus. The sending source apparatus, which receives the ACK packet, sends next data on a condition that an amount of data which is designated by the window size is the maximum permissible value. Accordingly, the network repeater, in which a state of congestion is caused, instructs the sending source apparatus to stop sending the packet through sending back the ACK packet whose window size is set to "0".

Through carrying out the QoS control to the network repeater, the congestion in the network repeater is avoided, and it is realized that the data transfer is adapted to a service (or, application) and well modulated. That is, through carrying out the control so as to give the high priority to the service, which requires the real time property, such as the IP telephone and the animation delivery which bring an unpleasant feeling if delay or discard of the packet is caused, communication quality of the data transfer is secured. Moreover, the e-mail service and the Web access, which are not influenced so severely by the delay or the discard of the packet, are given the medium priority and the low priority. As a result, an order of the data transfer, which flows through the congested network, is maintained to a predetermined extent.

Patent document 1 discloses an art related to flow control, which is carried out per a priority class assigned to each of plural queues, in a repeater connected by the layer 2 network. According to the patent document 1, the repeater, which receives a data frame, monitors an amount of data accumulated in the plural queues each of which is assigned the priority class different from ones of the other queues, and judges whether an amount of the data exceeds a stopping threshold value which is determined in advance. In the case that the repeater, which receives the data frame, judges that an amount of the data exceeds the stopping threshold value, the repeater sends a flow control message. The flow control message includes priority class information and stopping time information which are assigned to the queue whose amount of the data exceeds the stopping threshold value. When the repeater, which sends the data frame, receives the flow control message including the priority class information and the stopping time information, the repeater receiving the flow control message stops sending the data frame, which belongs to the designated priority class, for a designated stopping time. According to the art which the patent document 1 discloses, the PAUSE frame is used as the flow control message, and the designated priority class is set in a blank area of the PAUSE frame.

Patent document 2 discloses an art which can carry out transferring data without causing congestion not only in a sending source apparatus and a destination apparatus but also in a network between the sending source apparatus and the destination apparatus. A flow control apparatus, which the patent document 2 discloses, includes a transfer unit which carries out data transfer between termination apparatuses, a network interface unit which carries out the data transfer with a network, a monitoring unit, and a control unit. On the basis of an amount of data which is transferred between the transfer unit and the network interface unit, the monitoring unit monitors whether the flow control apparatus is in a state of congestion. The monitoring unit especially monitors an amount of the data per a value of a queue which indicates priority of data. The control unit notifies the termination apparatus or a network device, which is a data sending source apparatus, that an amount of data which should be transferred is restricted on the basis of the results of the monitoring. At this time, the control unit changes a value of the window size of the ACK packet of TCP/IP and notifies the sending source apparatus of the window size.

Here, patent document 3 and patent document 4 disclose an art related to a dynamic rate control scheduler and packet flow control for an ATM (Asynchronous Transfer Mode) cell in an ATM switching system. Furthermore, patent document 5 discloses an art to increase or decrease a size of an assigned bandwidth according to increase or decrease of an amount of data.

RELATED ART DOCUMENT

Patent Document

[Patent document 1] Tokukai 2007-096910
[Patent document 2] Tokukai 2009-267642
[Patent document 3] Tokukai 1999-098155
[Patent document 4] Tokuhyou 2000-503176
[Patent document 5] Tokukai 2000-196641

SUMMARY OF INVENTION

Techinical Problem

When designing a network, a parameter on the QoS control of the network repeater may be determined generally in many cases with assuming an outward transmission speed and a bandwidth per the priority which are related to the network repeater. As the parameter, the bandwidth per the priority which is used in the bandwidth control, a bandwidth which should be guaranteed, a ratio to an effective bandwidth, information, which is used in the flow control, to instruct to restrict sending, a reference point for the instruction or the like is exemplified.

However, in the case that the outward line of the network repeater is a wireless line, the transmission speed of the outward line changes easily.

For example, a wireless system adopting the adaptive coding/modulation, which is called the adaptive modulation, uses an art to change a modulation method according to a change in a propagation environment of a radio wave, for example, a change in the bit error rate. According to the adaptive modulation, it is possible to restrict an increase of the error rate through carrying out the low speed modulation when the propagation environment is degraded, and consequently it is possible to avoid the degradation of the communication quality. Moreover, it is possible to make a transmission speed high through carrying out the high speed modulation when the propagation environment is good.

As the modulation method, BPSK (Binary Phase Shift Keying), QPSK (Quadrature Phase Shift Keying), 16 QAM (16 Quadrature Amplitude Modulation) or the like is exemplified. Number of bits, which can be transmitted per one symbol, is 1 in case of BPSK, 2 in case of QPSK, and 4 in case of 16 QAM. Therefore, characteristic of the bit error rate is degraded in an order of BPSK, QPSK and.16 QAM When the propagation environment of the radio wave is bad, BPSK or QPSK, which is the modulation method having a strong immunity against the bit error, is used as the modulation method. Meanwhile, when the propagation environment is good, for example, 16 QAM, which has the transmission speed 2 times higher than that of QPSK, is used as the modulation method.

Accordingly, in the case that the outward line of the network repeater is based on the wireless system which applies the adaptive modulation, the transmission speed is changed easily according to the change in the transmission environment of the radio wave.

Therefore, there is a problem that the QoS control, which a network designer intends, is not carried out in the case that the transmission speed of the outward line of the network repeater is changed. That is, the network designer sets the parameter on the QoS control according to the transmission speed between the network repeaters which is designed firstly. However, in the case that the assumed transmission speed is changed, the value set firstly is no longer optimum for the changed transmission speed.

For example, in the case that the transmission speed of the outward line becomes slow and the effective bandwidth becomes decreased, a stream which is assigned the high priority is processed preferentially on the basis of the priority control which is set, and consequently a process for a stream which is assigned the low priority becomes stagnant. As a result, number of the packets, which stagnate in an output buffer corresponding to the stream having the low priority, exceeds a threshold value which is used for judging whether the congestion is caused or not, and consequently the flow control begins working for restricting a data flow which is inputted into the network repeater.

That is, the flow control starts working due to the stagnation of the stream which has the low priority, and as a result, all flows which are inputted into the network repeater are restricted, and furthermore even the stream having the high priority is restricted. Therefore, it is impossible to provide the optimum QoS control.

Here, the flow control per the priority class which is disclosed in the patent document 1 may be able to cope with the above-mentioned case. However, in order to carry out the flow control per the priority class, it is necessary to embed the priority class in a blank area of the PAUSE frame as described in the patent document 1, etc., and to exchange the flow control information per the class between the apparatuses. Therefore, it is impossible to apply the flow control, which is described in the patent document 1, to a device which uses the standardized protocol as it is for the flow control.

An object of the present invention is to solve the above-mentioned problem through providing a network repeater, a QoS control method, and a storage medium storing a QoS control program which can carry out the optimum QoS control without modifying the standardized protocol for the flow control and with tracking the change in the transmission speed of the outward line.

Solution to Problem

In order to realize the object mentioned above, a network repeater according to the present invention includes: a flow control means to carry out flow control for restricting inflow of a data flow which is received through an inward line; a bandwidth control means to carry out bandwidth control of controlling a bandwidth of a data flow which is received through the inward line and is sent through an outward line; and an outward line monitoring means to monitor a change in a state of the outward line. In the case that the monitored state of the outward line satisfies a specified condition which is determined in advance, either the flow control or the bandwidth control is carried out on a condition corresponding to the specified condition.

Moreover, a QoS control method according to the present invention for a network repeater which receives data through an inward line and sends the received data through an outward line, includes: monitoring a change in a state of the outward line; and carrying out either flow control for restricting inflow of a data flow received through the inward line or bandwidth control of controlling a bandwidth of a data flow received through the inward line and sent through the outward line on a condition corresponding to a specified condition, which is determined in advance, in the case that the monitored state of the outward line satisfies the specified condition.

Moreover, a storage medium storing a QoS control program according to the present invention which is used for a network repeater receiving data through an inward line and sending the received data through an outward line, and which makes a computer execute: a process of monitoring a change in a state of the outward line; and a process of carrying out either flow control for restricting inflow of a data flow received through the inward line or bandwidth control of controlling a bandwidth of a data flow received through the inward line and sent through the outward line on a condition corresponding to a specified condition, which is determined in advance, in the case that the monitored state of the outward line satisfies the specified condition.

Advantageous Effects of Invention

According to the present invention, even if the transmission speed of the outward line of the network repeater is changed, it is possible to track the change in the transmission speed of the outward line and to carry out the optimum QoS control which the network designer intends.

DESCRIPTION OF EMBODIMENTS

An exemplary embodiment to incorporate a network repeater according to the present invention will be described with reference to a drawing.

Figure 1:
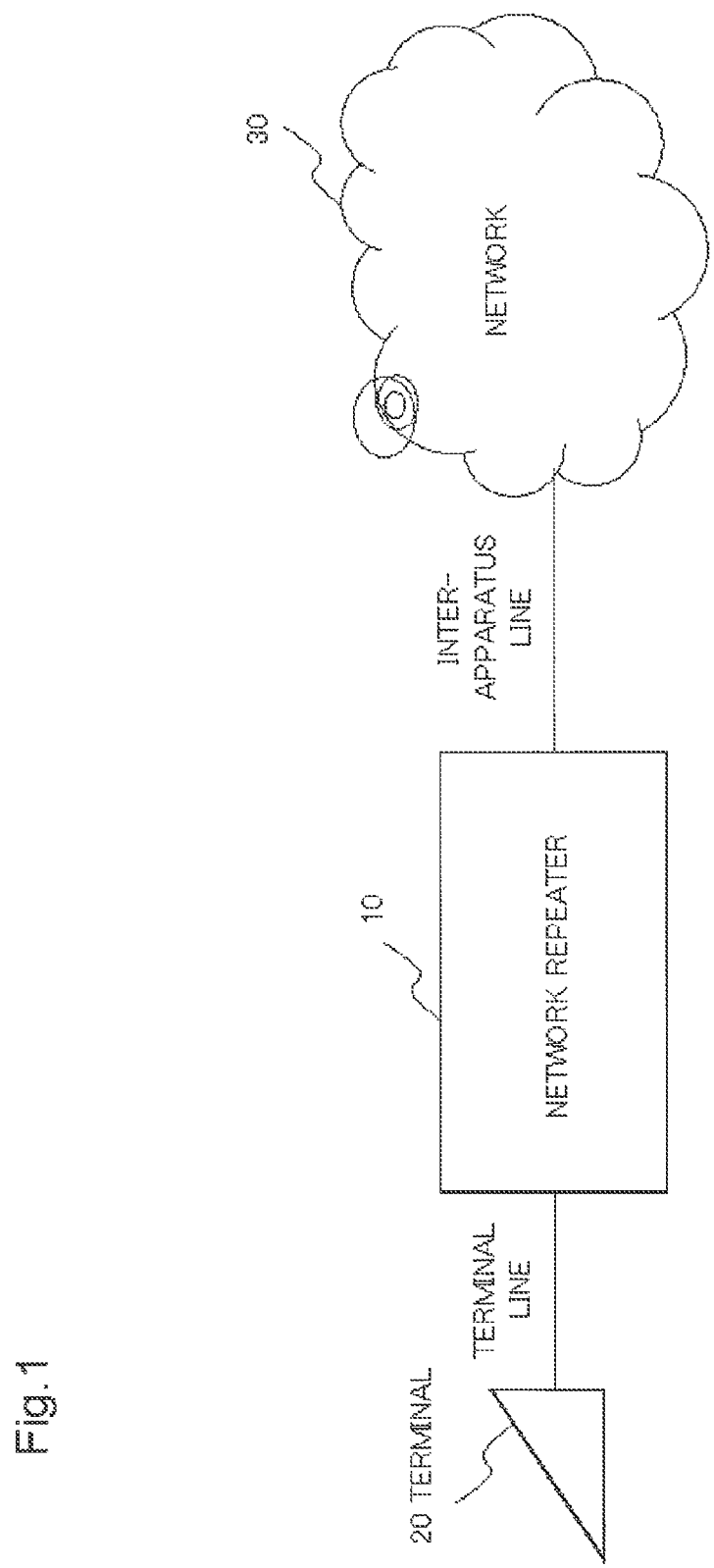
[FIG. 1] is a system configuration diagram showing an example of a system which applies a network repeater according to the present invention.

FIG. 1 is a system configuration diagram showing an example of a system which applies the network repeater according to the present invention.

A network repeater 10 includes an inward line and an outward line, and is connected with a front position apparatus and a rear position apparatus, respectively. FIG. 1 shows an example that the network repeater 10 is connected with a terminal 20, which is corresponding to the front position apparatus, through a terminal line, and is connected with another network repeater (not shown in the figure), which is corresponding to the rear position apparatus and belongs to a network 30, through an inter-apparatus line. The network repeater 10 sends data, which the network repeater 10 receives from the terminal 20 through the terminal line, to the network 30 through the inter-apparatus line. Moreover, the network repeater 10 transfers data in a reverse direction. That is, the network repeater 10 sends data, which the network repeater 10 receives from the network 30 through the inter-apparatus line, to the terminal 20 through the terminal line. The exemplary embodiment is related to QoS control for the network repeater which receives data through the inward line and sends the data through the outward line.

Moreover, a transmission speed on the inter-apparatus line is not always constant in the system configuration, and changes due to an influence of an external environment or systematically.

As a case that the transmission speed changes due to the influence of the external environment, a case that the inter-apparatus line is based on a wireless system is exemplified. In particular, in the case that the wireless system adopts the adaptive modulation method, the change in the transmission speed rate which is caused by the influence of the external environment is remarkable.

As a case that the transmission speed on the inter-apparatus line changes systematically, a case that the transmission speed is changed according to a time zone on the basis of a network plan. For example, a whole day is divided to a daylight time zone, an evening to night time zone, and a mid night to early morning time zone. Then, an operation, which makes the transmission speed and a ratio in the bandwidth control changed in each time zone, is carried out.

[First Exemplary Embodiment]

A first exemplary embodiment of a network repeater which is related to the present invention and which is applied to the system will be described in the following.

Figure 2:
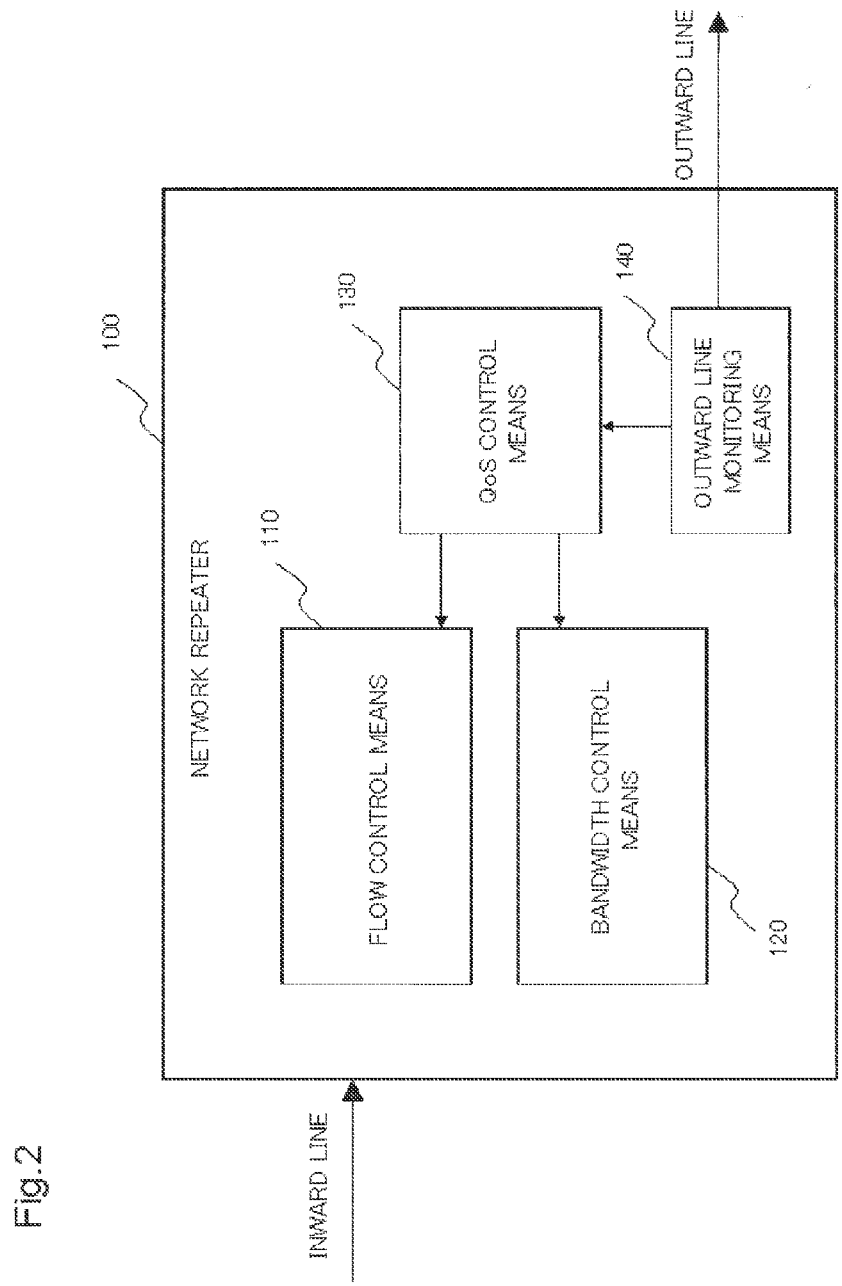
[FIG. 2] is a configuration block diagram showing a first exemplary embodiment of the network repeater according to the present invention.

FIG. 2 is a configuration block diagram showing the first exemplary embodiment of the network repeater according to the present invention. A configuration of a network repeater 100 according to the first exemplary embodiment will be described with reference to FIG. 2.

As shown in FIG. 2, the network repeater 100 according to the first exemplary embodiment includes a flow control means 110, a bandwidth control means 120, a QoS control means 130 and an outward line monitoring means 140.

The flow control means 110 carries out flow control for restricting inflow of a data flow which is received through an inward line. The bandwidth control means 120 carries out bandwidth control of controlling a bandwidth of a data flow which is received through the inward line and is sent through an outward line. The QoS control means 130 manages parameter information on QoS control which includes a process of receiving data through the inward line up to a process of sending data through the outward line. Moreover, the outward line monitoring means 140 monitors a change in a state of the outward line. In the case that the monitored state of the outward line satisfies a specified condition which is determined in advance, the outward line monitoring means 140 notifies the QoS control means 130 of specified condition information.

When the QoS control means 130 acquires the specified condition information on the outward line from the outward line monitoring means 140, the QoS control means 130 acquires the parameter information on the QoS control which is predetermined correspondingly to the specified condition indicated by the specified condition information. Then, the QoS control means 130 transfers the acquired parameter information on the QoS control to the flow control means 110 and the bandwidth control means 120.

The flow control means 110 controls carrying out the flow control on the basis of the parameter information on the QoS control which is transferred by the QoS control means 130.

The bandwidth control means 120 carries out the bandwidth control, which the parameter information specifies, on the basis of the parameter information on the QoS control which is transferred by the QoS control means 130.

Figure 3:
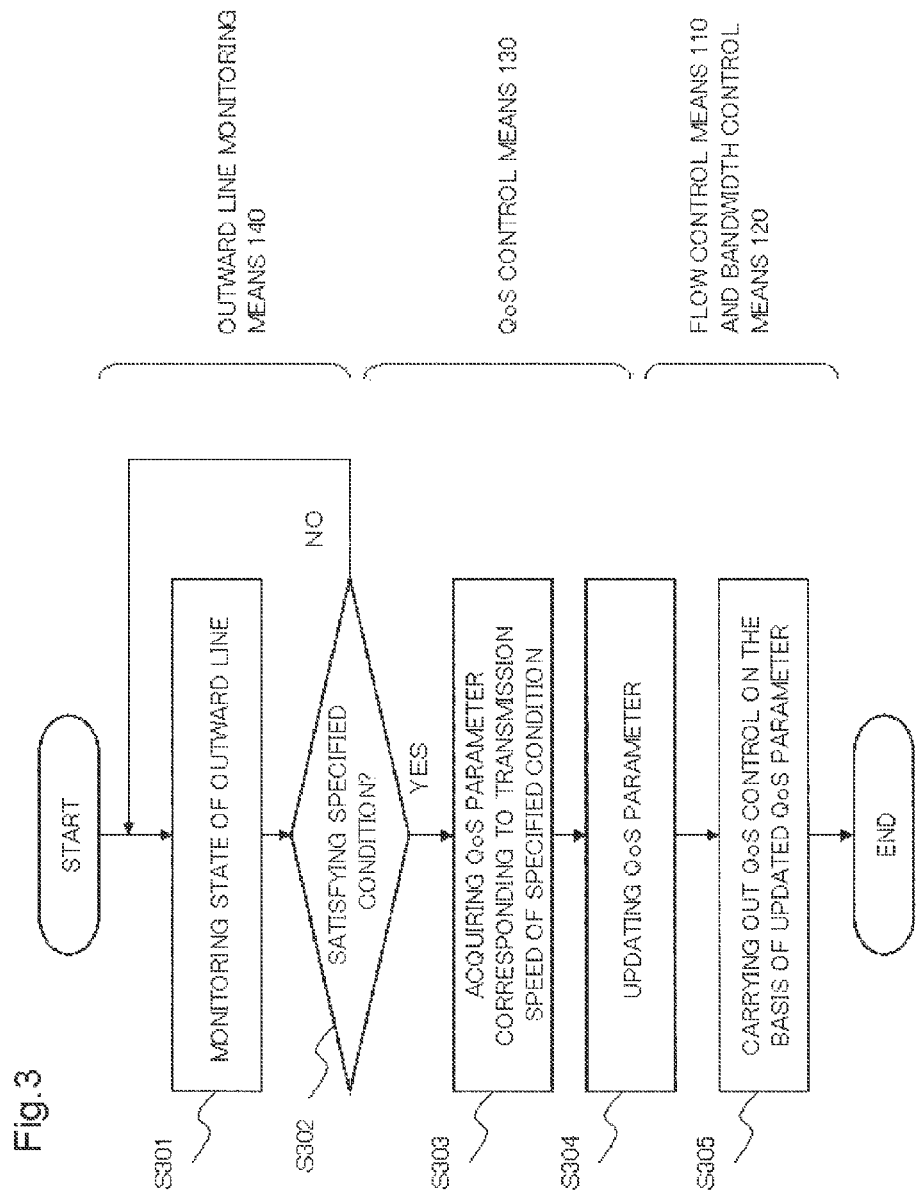
[FIG. 3] is a flowchart explaining an operation of updating a setting of a QoS parameter in the network repeater according to the first exemplary embodiment.

FIG. 3 is a flowchart explaining an operation of updating the setting of the QoS parameter in the network repeater according to the first exemplary embodiment. An operation of the network repeater 100 according to the first exemplary embodiment will be described with reference to FIG. 3.

The outward line monitoring means 140 monitors the state of the outward line (S301). In the case that the monitored state of the outward line satisfies the specified condition which is determined in advance, the outward line monitoring means 140 notifies the QoS control means 130 of the specified condition information (YES in S302).

When the QoS control means 130 acquires the specified condition information on the outward line, the QoS control means 130 acquires the parameter information on the QoS control which is predetermined correspondingly to the specified condition indicated by the specified condition information (S303). The QoS control means 130 notifies the bandwidth control means 120 and the flow control means 110 of the parameter information on the QoS control to update the old parameter information (S304).

The bandwidth control means 120 and the flow control means 110 update the old parameter information, which the bandwidth control means 120 and the flow control means 110 hold, on the basis of the parameter information of which the QoS control means 130 notifies to update the old parameter information (S304 in FIG. 3). Then, the bandwidth control means 120 and the flow control means 110 carry out the respective QoS control on the basis of the updated parameter information on the QoS control (S305).

According to the network repeater of the first exemplary embodiment which has the configuration mentioned above, through tracking the change in the state of the outward line, it is possible to carry out the QoS control on the basis of the parameter information on the QoS control which is corresponding to the changed state and which is determined in advance. Therefore, through setting the parameter information on the QoS control in advance correspondingly to the anticipated change in the state of the outward line, it is possible to carry out the optimum QoS control which the network designer intends.

[Second Exemplary Embodiment]

Next, a network repeater according to a second exemplary embodiment will be described with reference to FIG. 4.

Figure 4:
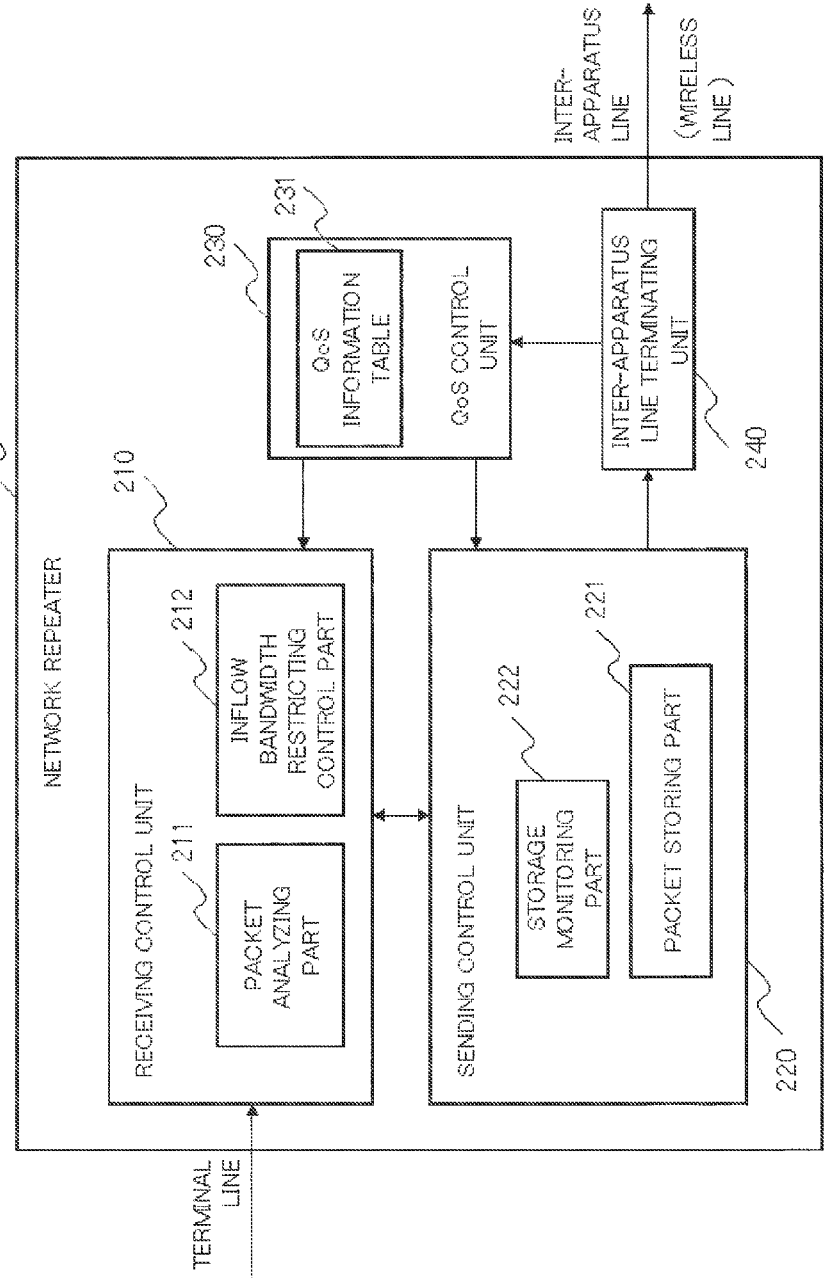
[FIG. 4] is a configuration block diagram showing a second exemplary embodiment of the network repeater according to the present invention.

FIG. 4 is a configuration block diagram showing the second exemplary embodiment of the network repeater according to the present invention.

A QoS control unit 230 of a network repeater 200 according to the second exemplary embodiment manages parameter information on QoS control. Moreover, the QoS control unit 230 includes a QoS information table 231 in which the parameter information on the QoS control is set. In the network repeater 200 according to the second exemplary embodiment, an inward line is explained as a terminal line which is connected with a front position apparatus not shown in the figure, and an outward line is explained as an inter-apparatus line which is connected with a rear position apparatus not shown in the figure and which is a wireless line.

QoS information table 231 is a table which preliminarily sets a value of the parameter on the QoS control, which should be determined according to a transmission speed on the wireless inter-apparatus line. Moreover, the network repeater 200 according to the second exemplary embodiment includes an inter-apparatus line terminating unit 240 which monitors the transmission speed on the inter-apparatus line and which, in the case that the transmission speed changes, outputs the changed transmission speed information. The network repeater 200 according to the second exemplary embodiment includes furthermore a receiving control unit 210 and a sending control unit 220.

The receiving control unit 210 includes a packet analyzing part 211 and an inflow bandwidth restricting control part 212.

The packet analyzing part 211 analyzes a packet which is received from the front position apparatus (not shown in the figure) through the terminal line, and identifies a priority class of the packet. Or, it may be preferable that the packet analyzing part 211 identifies the priority class on the basis of a type of a port which accommodates the terminal line.

The inflow bandwidth restricting control part 212 carries out inflow bandwidth restriction. That is, the inflow bandwidth restricting control part 212 monitors a data flow, which flows into the network repeater through the terminal line, per the priority class, and discards the data flow which flows into the network repeater in excess of a predetermined bandwidth. Moreover, the inflow bandwidth restricting control part 212 holds inflow bandwidth restriction information on the data flow per the priority class as parameter information.

The sending control unit 220 includes a packet storing part 221 and a storage monitoring part 222.

The packet storing part 221 stores the packet, which is in a state of waiting for being outputted, per the priority class which is identified by the packet analyzing part 211 of the receiving control unit 210. The packet storing part 221 is a so-called output buffer, and includes a FIFO (First In First Out) queue which is arranged per the priority class.

The storage monitoring part 222 monitors a stagnant state of the packet in the packet storing part 221. When the stagnant state in the packet storing part 221 reaches a predetermined threshold value, the storage monitoring part 222 outputs congestion information which indicates that the packet storing part 221 is in a state of congestion. Moreover, when the state of congestion is resolved, the storage monitoring part 222 outputs congestion resolution information.

According to the network repeater 200 of the second exemplary embodiment which has the configuration mentioned above, the transmission speed information on the inter-apparatus line, which the inter-apparatus line terminating unit 240 outputs, is received by the QoS control unit 230. The QoS control unit 230, which receives the transmission speed information on the inter-apparatus line, refers to the QoS information table 231. Then, the QoS control unit 230 reads the parameter information on the QoS control which is set in advance correspondingly to the transmission speed identified on the basis of the transmission speed information on the inter-apparatus line.

According to the second exemplary embodiment, the inflow bandwidth restriction information on the data flow per the priority class is read as the parameter information on the QoS control. The inflow bandwidth restriction information on the data flow per the priority class, which is read by QoS control unit 230 from the QoS information table 231, is transferred to the inflow bandwidth restricting control part 212.

The inflow bandwidth restricting control part 212 updates the parameter information on the basis of the inflow bandwidth restriction information on the data flow per the priority class, which is transferred by the QoS control unit 230, and controls the inflow bandwidth restriction for the data flow per the priority class on the basis of the updated parameter information.

Even if the transmission speed on the inter-apparatus line is changed, by virtue of the configuration mentioned above, the network repeater according to the second exemplary embodiment can realize the control of the inflow bandwidth restriction, which is optimum for the changed transmission speed and which is carried out to the data flow per the priority class.

Figure 5:
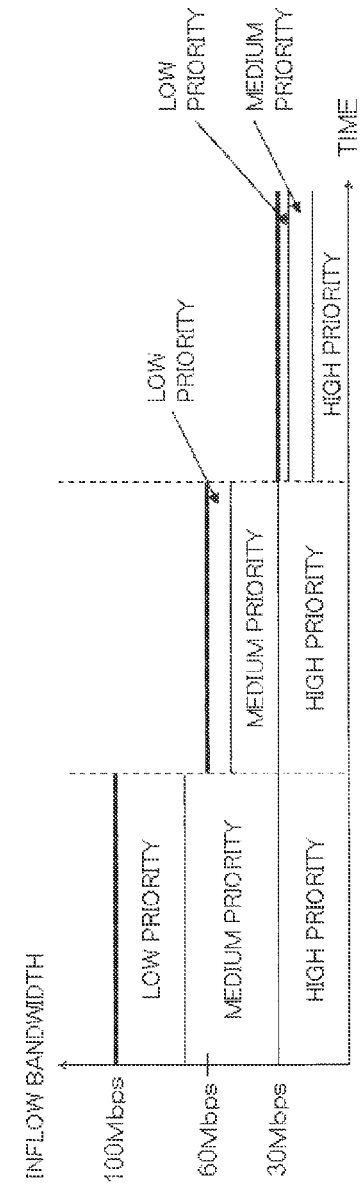
[FIG. 5] shows a setting example of a QoS information table in the network repeater according to the second exemplary embodiment.

FIG. 5 shows a setting example of the QoS information table in the network repeater according to the second exemplary embodiment.

FIG. 5 shows an example of the QoS information which is set in the case that the transmission speed on the inter-apparatus line is changed to 100 Mbps (Megabit per second), 60 Mbps and 30 Mbps.

FIG. 5(a) shows a setting example of the inflow bandwidth restriction information on the data flow per the priority class which is exemplified as the QoS parameter information. FIG.

5(b) shows schematically a state of occupying the bandwidth per the priority class out of the whole inflow bandwidth in the case that the inflow bandwidth restriction is carried out by use of the parameter which is set as mentioned above.

In the case that the transmission speed on the inter-apparatus line is 100 Mbps, the inflow bandwidth restriction is controlled so that the inflow of 30 Mbps, 40 Mbps, and 30 Mbps may be permitted for the flow of the high priority class, the flow of the medium priority class, and the flow of the low priority class, respectively. In the case that the transmission speed of the inter-apparatus line is changed to 60 Mbps, the congestion is caused in the apparatus easily for the permitted capacities mentioned above. Then, in the case, inflow capacities for the flow of the high priority class, the flow of the medium priority class, and the flow of the low priority class are changed to 30 Mbps, 20 Mbps and 10 Mbps, respectively. Similarly, in the case that the transmission speed on the inter-apparatus line is changed to 30 Mbps, the inflow capacities for the flow of the high priority class and the flow of the medium priority class are changed to 15 Mbps and 10 Mbps, respectively. Moreover, the inflow capacity for the flow of the low priority class is changed to 5 Mbps.

Figure 6:
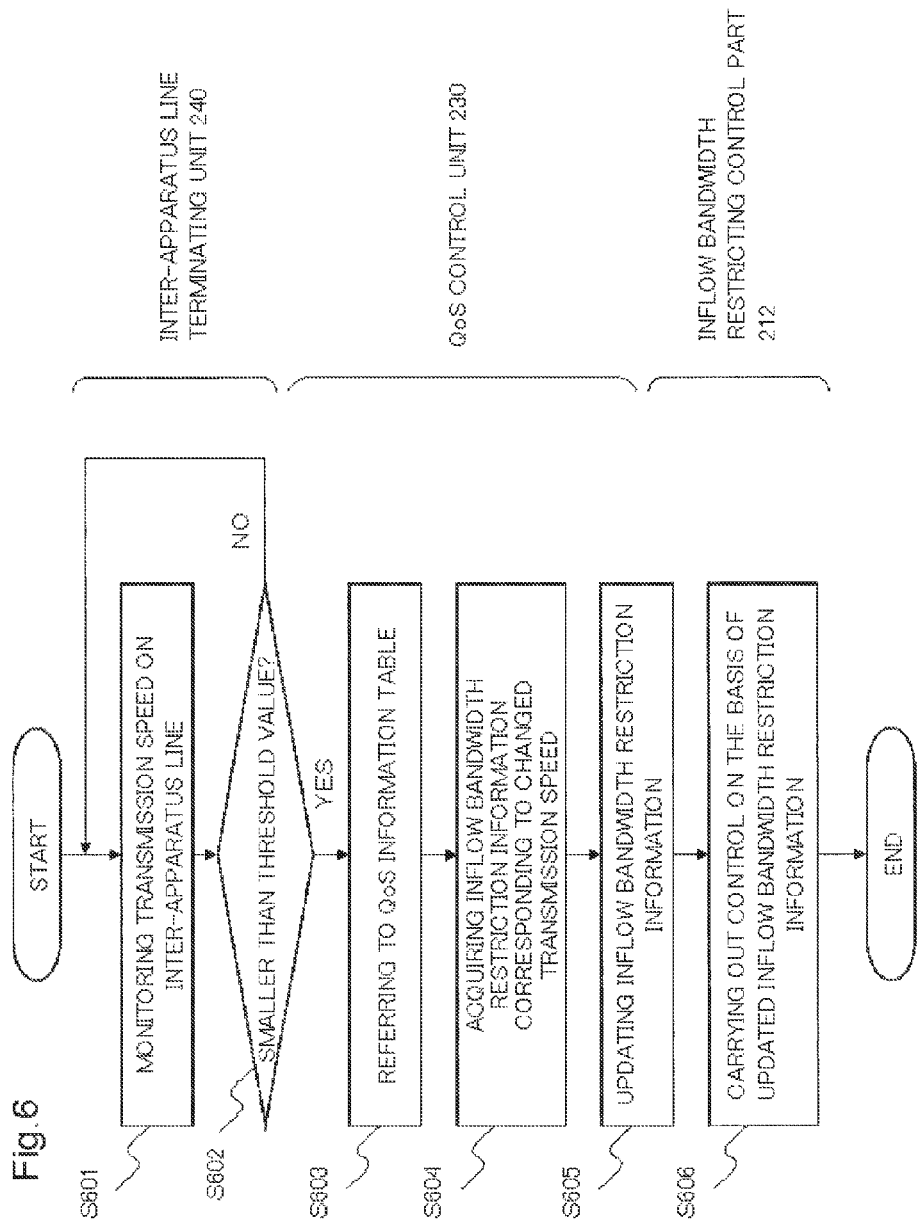
[FIG. 6] is a flowchart explaining an operation of updating a setting of a QoS parameter in the network repeater according to the second exemplary embodiment.

FIG. 6 is a flowchart explaining an operation of updating the QoS setting parameter in the network repeater according to the second exemplary embodiment.

The inter-apparatus line terminating unit 240 monitors the transmission speed on the inter-apparatus line (S601). In the case that the transmission speed on the inter-apparatus line becomes smaller than a predetermined transmission speed, the inter-apparatus line terminating unit 240 notifies the QoS control unit 230 of the changed transmission speed information (YES in S602). Or, it may be preferable that the inter-apparatus line terminating unit 240 always notifies the QoS control unit 230 of the transmission speed information, and then the QoS control unit 230 judges whether the transmission speed on the inter-apparatus line becomes smaller than the predetermined transmission speed.

The QoS control unit 230 refers to the QoS information table 231 (S603). The QoS control unit 230 acquires the inflow bandwidth restriction information which is set in the QoS information table 231 correspondingly to the changed transmission speed (S604). The acquired inflow bandwidth restriction information is transferred to the inflow bandwidth restricting control part 212 to update the old inflow bandwidth restriction information (S605). The inflow bandwidth restricting control part 212 carries out the inflow bandwidth restricting control to the data flow, which flows into the network repeater 200, per the priority class on the basis of the updated inflow bandwidth restriction information (S606).

According to the network repeater of the second exemplary embodiment which has the above-mentioned configuration, it is possible to track the change in the transmission speed on the inter-apparatus line, and to carry out the QoS control correspondingly to the changed state on the basis of the inflow bandwidth restriction information which is determined in advance. Therefore, through predetermining the inflow bandwidth restriction information correspondingly to the anticipated change in the state of the inter-apparatus line, it is possible to carry out the optimum QoS control which the network designer intends.

[Third Exemplary Embodiment]

Next, a network repeater according to a third exemplary embodiment will be described. The network repeater according to the third exemplary embodiment holds information on bandwidth control for an outward line and information on carrying out flow control as parameter information on QoS control.

Figure 7:
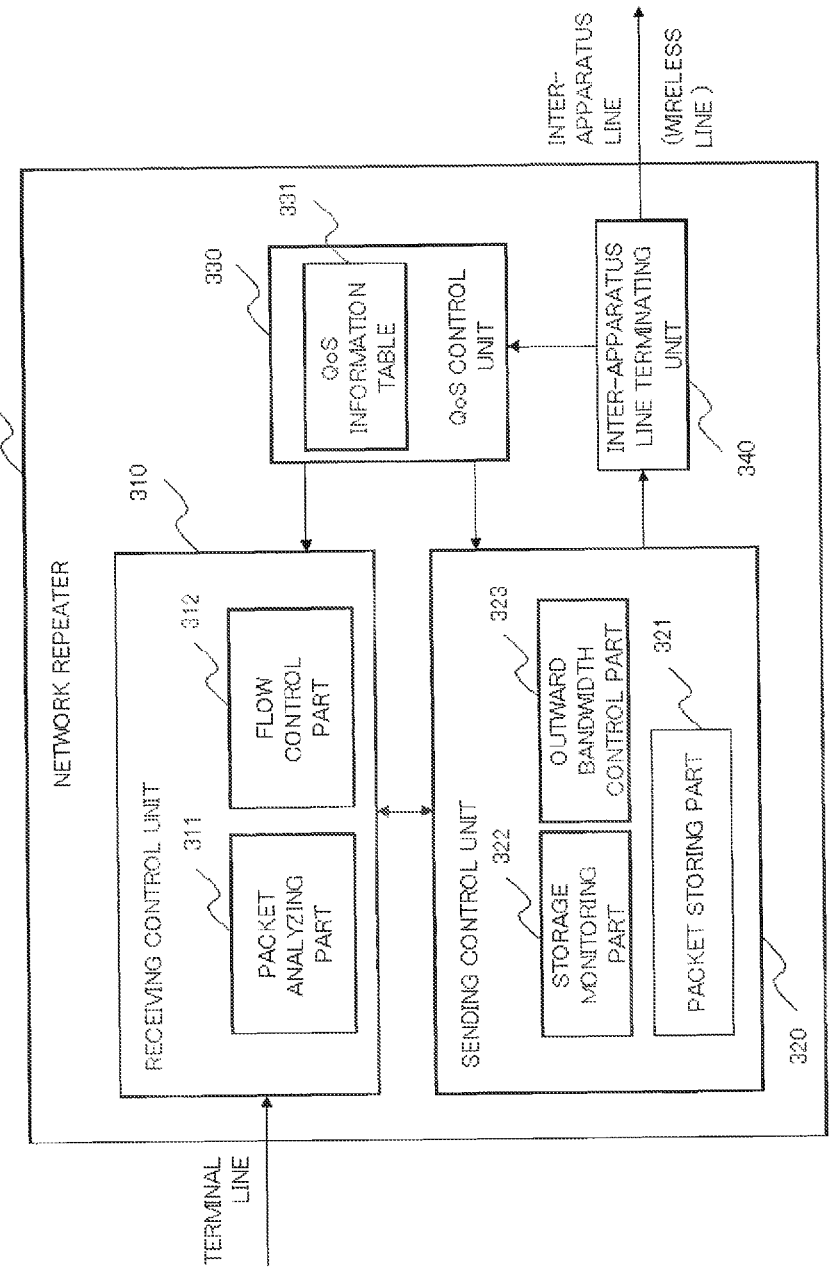
[FIG. 7] is a configuration block diagram showing a third exemplary embodiment of the network repeater according to the present invention.

FIG. 7 is a configuration block diagram showing the third exemplary embodiment of the network repeater according to the present invention.

A network repeater 300 according to the third exemplary embodiment includes a QoS information table 331, which is mounted on a QoS control unit 330, similarly to the network repeater 200 according to the second exemplary embodiment. A value of the parameter on the QoS control, which should be determined according to a transmission speed on a wireless inter-apparatus line, is set beforehand in the QoS information table 331.

Here, also in the third exemplary embodiment, an inward line is explained as a terminal line, which is connected with a front position apparatus not shown in the figure, and the outward line is explained as an inter-apparatus line which is connected with a rear position apparatus not shown in the figure and which is a wireless line. Moreover, the network repeater 300 according to the third exemplary embodiment is similar to the network repeater 200 according to the second exemplary embodiment in a point that the network repeater 300 includes an inter-apparatus line terminating unit 340, a receiving control unit 310 and a sending control unit 320.

The inter-apparatus line terminating unit 340 monitors the transmission speed on the inter-apparatus line. When the transmission speed is changed, the inter-apparatus line terminating unit 340 outputs changed transmission speed information.

The receiving control unit 310 includes a packet analyzing part 311 and a flow control part 312. The packet analyzing part 311 analyzes a packet, which is received through the terminal line, and identifies a priority class of the packet. Or, it may be preferable that the packet analyzing part 311 identifies the priority class on the basis of a port which accommodates the terminal line.

The flow control part 312 carries out the flow control of restricting a data flow which flows into the network repeater 300 through the terminal line. It may be preferable that the flow control is carried out through notifying the front position apparatus of sending stopping time by use of the PAUSE frame, or, it may be preferable that the flow control is carried out through notifying the front position apparatus of the window size by use of the ACK frame as mentioned above.

The sending control unit 320 includes a packet storing part 321, a storage monitoring part 322 and an outward bandwidth control part 323.

The packet storing part 321, which has the same configuration and the same function as ones of the packet storing part 221 according to the second exemplary embodiment, stores the packet, which is in a state of waiting for being outputted, per the priority class.

The storage monitoring part 322 has a function to monitor a stagnant state of the packet in the packet storing part 321, and to judge according to a state of a flow control flag whether it is necessary or not to carry out the flow control. Here, the flow control flag will be described detailedly in the following.

That is, when the monitored stagnant state of a queue, which is arranged per the priority class, reaches a predetermined threshold value, the storage monitoring part 322 outputs congestion information, which indicates that the packet storing part 321 is in a state of congestion, in the case that the flow control flag of the corresponding priority class is set ON. When the state of congestion is resolved, the packet storing part 321 outputs congestion resolution information. However, even if the monitored stagnant state of the queue reaches the predetermined threshold value, the storage monitoring unit 322 does not output the congestion information as far as the flow control flag of the corresponding priority class is set OFF. Accordingly, the storage monitoring part 322 holds the flow control flag per the priority class as the parameter information.

Here, the flow control part 312 of the receiving control unit 310 carries out the flow control on the basis of the congestion information which the storage monitoring part 322 outputs.

The outward bandwidth control part 323 makes the packet storing part 321 output the packet to the inter-apparatus line terminating unit 340 on the basis of outward bandwidth control information, and controls the bandwidth of the inter-apparatus line per the priority class. That is, the outward bandwidth control part 323 controls the bandwidth per the priority class, which is assigned to the data flow sent by the network repeater 300, within an effective bandwidth of the inter-apparatus line.

An operation of updating the setting of the QoS parameter will be described with reference to FIG. 8.

Figure 8:
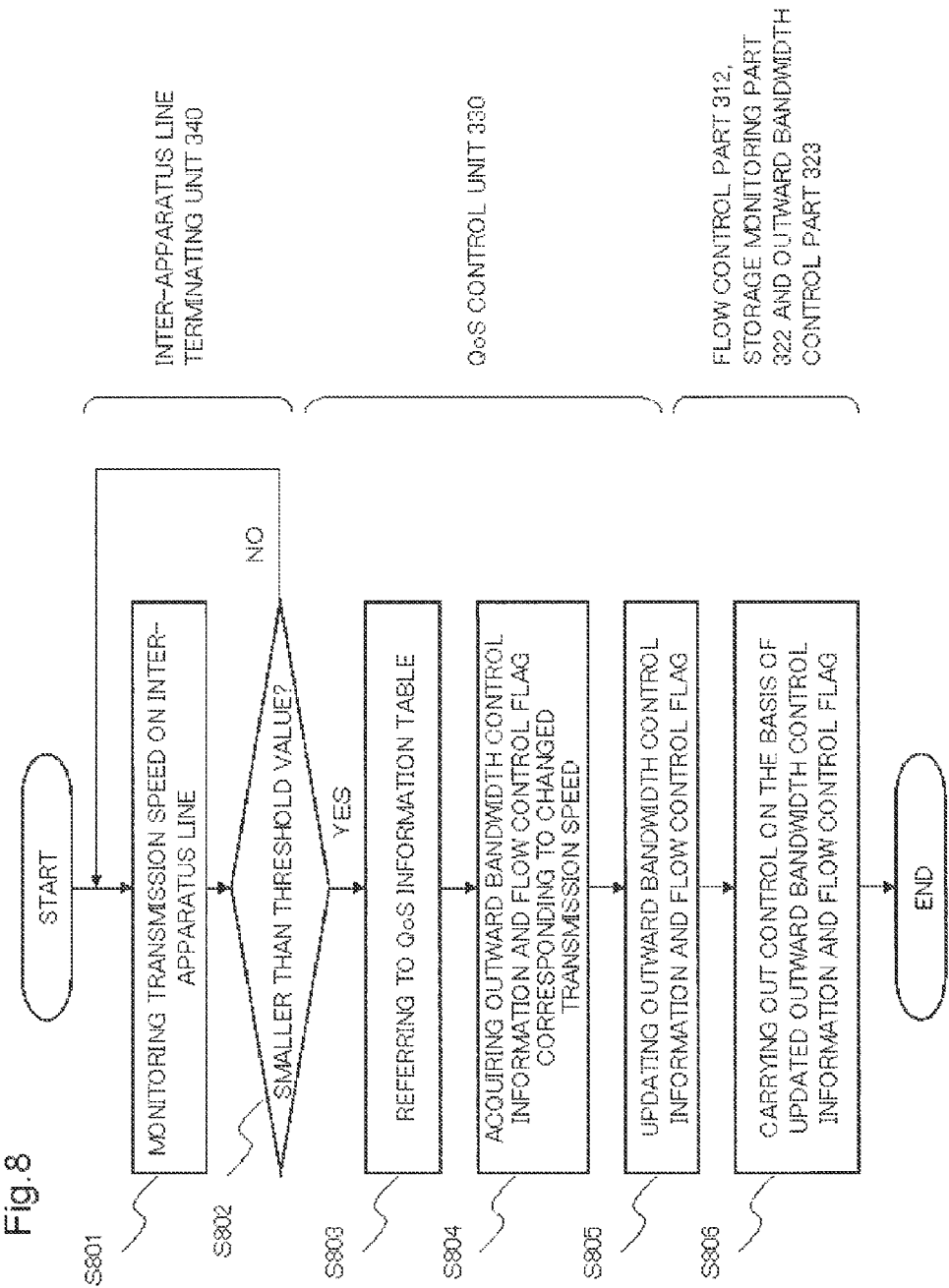
[FIG. 8] is a flowchart explaining an operation of updating a setting of a QoS parameter in the network repeater according to the third exemplary embodiment.

FIG. 8 is a flowchart explaining the operation of updating the setting of the QoS parameter in the network repeater 300 according to the third exemplary embodiment.

The inter-apparatus line terminating unit 340 monitors the transmission speed on the inter-apparatus line (S801). In the case that the transmission speed on the inter-apparatus line becomes smaller than a predetermined transmission speed, the inter-apparatus line terminating unit 340 notifies the QoS control unit 330 of the changed transmission speed information (YES in S802). Or, it may be preferable that the inter-apparatus line terminating unit 340 always notifies the QoS control unit 330 of the transmission speed information on the inter-apparatus line, and then the QoS control unit 330 judges whether the transmission speed on the inter-apparatus line becomes smaller than the predetermined transmission speed.

The QoS control unit 330 refers to the QoS information table 331 (S803). The QoS control unit 330 acquires the QoS parameter information which is set in the QoS information table 331 correspondingly to the changed transmission speed. The QoS parameter information, which is set in the third exemplary embodiment, is the outward bandwidth control information and the flow control flag (S804). The acquired outward bandwidth control information is transferred to the outward bandwidth control part 323 to update the QoS parameter information which the outward bandwidth control part 323 holds (S805). Moreover, the acquired flow control flag is transferred to the storage monitoring part 322 to update the QoS parameter information which the storage monitoring part 322 holds (S805).

The outward bandwidth control part 323 updates the parameter information on the basis of the outward bandwidth control information which is transferred by the QoS control unit 330, and carries out the bandwidth control for the inter-apparatus line on the basis of the updated parameter information (S806).

Moreover, the storage monitoring unit 322 updates the parameter information on the basis of the flow control flag per the priority class which is transferred by the QoS control unit 330, and carries out the bandwidth control for the inter-apparatus line on the basis of the updated parameter information (S806). The flow control part 312 carries out the flow control on the basis of the congestion information which the storage monitoring part 322 outputs.

Next, an operation carried out by the network repeater 300 according to the third exemplary embodiment will be described with reference to a specific example of the QoS information table 331.

Figure 9:
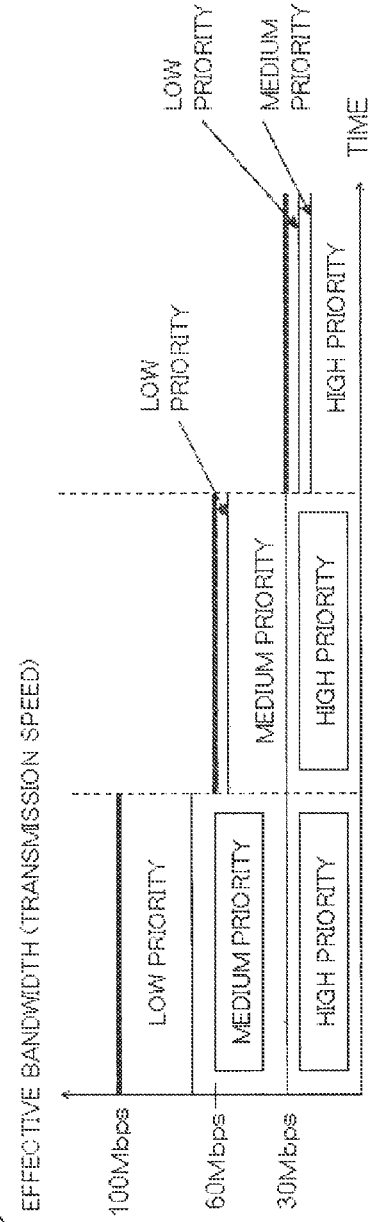
[FIG. 9] shows a setting example of a QoS information table in the network repeater according to the third exemplary embodiment.
Figure 10:
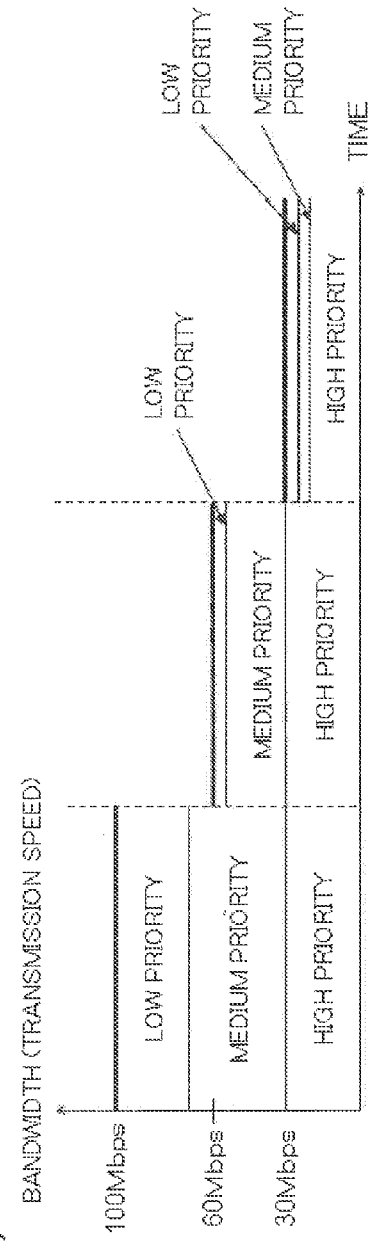
[FIG. 10] shows another setting example of the QoS information table in the network repeater according to the third exemplary embodiment.

FIG. 9 shows a setting example of the QoS information table 331 in the network repeater 300 according to the third exemplary embodiment. FIG. 10 shows another setting example of the QoS information table 331.

FIG. 9 and FIG. 10 show an example of the QoS parameter setting which is carried out in the case that the transmission speed (effective bandwidth) on the inter-apparatus line is changed to 100 Mbps, 60 Mbps and 30 Mbps. FIG. 9 shows an example of carrying out the bandwidth control on the assumption of occupying the bandwidth individually and operating each occupied bandwidth, and FIG. 10 shows an example of carrying out the bandwidth control on the assumption of shaping a whole of communication and operating each bandwidth.

While the parameter on the bandwidth control of controlling the inflow bandwidth of the inward line is set in the QoS information table 231 according to the second exemplary embodiment which is described with reference to FIG. 5, the parameter on the bandwidth control for the outward line is set in the QoS information table 331 according to the third exemplary embodiment sets.

In the case of the example shown in FIG. 9(a), the flows which belong to the high priority class and the medium priority class occupy the bandwidths of 30 Mbps and 40 Mbps, respectively and use the bandwidths.

In the case that the transmission speed on the inter-apparatus line, of which the inter-apparatus line terminating unit 340 notifies, is changed to 60 Mbps, the QoS control unit 330 acquires the QoS parameter information, which is corresponding to the changed transmission speed, from the QoS information table 331. According to the QoS parameter information at this point of time, the flow belonging to the high priority class occupies the bandwidth of 30 Mbps, and the flows belonging to the medium priority class and the low priority class use 80% and 20%, respectively of the residual bandwidth. The parameter information on the bandwidth control is transferred to the outward bandwidth control part 323 to update the old parameter information which the outward bandwidth control part 323 holds. As a result, the flow, which belongs to the high priority class, occupies the bandwidth of 30 Mbps out of the effective bandwidth of 60 Mbps. Moreover, the bandwidth control makes the flows, which belong to the medium priority class and the low priority class, changed to using 80% and 20%, respectively of the residual bandwidth of 30 Mbps.

Moreover, in the case that the transmission speed on the inter-apparatus line, of which the inter-apparatus line terminating unit 340 notifies, is changed to 30 Mbps, the QoS parameter information, which is set correspondingly to 30 Mbps, is acquired, and the acquired parameter information on the bandwidth control is transferred to the outward bandwidth control part 323. As a result, the bandwidth control for the inter-apparatus line is carried out so that the flows belonging to the high priority class, the medium priority class and the low priority class may use 70%, 15% and 15%, respectively of the effective bandwidth of 30 Mbps.

FIG. 9(b) shows schematically a state of occupying the bandwidth of the inter-apparatus line per the priority class in the case of carrying out the bandwidth control by use of the parameter which is set as mentioned above.

Meanwhile, according to an example shown in FIG. 10(a), in each case of the transmission speeds of 100 Mbps, 60 Mbps and 30 Mbps, the bandwidth control is carried out so that the flows belonging to the high priority class, the medium priority class and the low priority class may use a whole of the bandwidth in the fixed ratio respectively. Moreover, FIG. 10(b) shows schematically a state of occupying the bandwidth of the inter-apparatus line per the priority class in the case of carrying out to the bandwidth control by use of the parameter which is set as mentioned above.

That is, in the case that the transmission speed, of which the inter-apparatus line terminating unit 340 notifies, is 100 Mbps, the bandwidth control is carried out so that the flows belonging to the high priority class, the medium priority class and the low priority class may use 30%, 40% and 15%, respectively of the effective bandwidth of 100 Mbps. In the case that the transmission speed, of which the inter-apparatus line terminating unit 340 notifies, is 60 Mbps, the bandwidth control is carried out so that the flows belonging to the high priority class, the medium priority class and the low priority class may use 50%, 40% and 10%, respectively of the effective bandwidth of 60 Mbps. Moreover, in the case that the transmission speed, of which the inter-apparatus line terminating unit 340 notifies, is 30 Mbps, the bandwidth control is carried out so that the flows belonging to the high priority class, the medium priority class and the low priority class may use 70%, 15% and 15%, respectively of the effective bandwidth of 30 Mbps.

As mentioned above, even if the QoS information table 331 is set as shown in FIG. 10, the control is carried out on the basis of the QoS parameter information which is set correspondingly to the transmission speed of which the inter-apparatus line terminating unit 340 notifies.

Next, "flow control flag" will be described.

As mentioned above, the flow control flag instructs whether the flow control should be carried out or not, in the case that the packet storing part 321 enters into the state of congestion. That the flow control flag is "OFF" means that the flow control is not carried out. On the other hand, that the flow control flag is "ON" means that the flow control is carried out. Moreover, there are two kinds of the flow control flag. That is, one is a flow control flag which is set per the priority class, and the other is a flow control comprehensive-flag which instructs with no relation to the priority class whether the flow control should be carried out or not. That is, the flow control flag per the priority class instructs per the priority class whether it is possible or not to carry out the flow control. Moreover, the flow control comprehensive-flag instructs with no relation to the priority class whether it is possible to carry out the flow control.

FIG. 9 shows an example of setting the flow control flag per the priority class, and FIG. 10 shows an example of setting the flow control comprehensive-flag.

An example of using the flow control flag per the priority class will be described.

According to the exemplary embodiment shown in FIG. 9, in the case that the transmission speed on the inter-apparatus line is 100 Mbps, the flows belonging to the medium priority class and the high priority class occupy the bandwidths individually. In the case that the transmission speed on the inter-apparatus line is 60 Mbps, the flow belonging to the high priority class occupies the bandwidth individually.

According to the above-mentioned bandwidth control, for example, if the flow control is carried out when the packet storing part 321, which stores the low priority class packet, enters into the state of congestion, the bandwidth occupied individually is not used effectively, and then QoS becomes degraded as a whole. That is, since it is assumed that the standardized protocol is used in the present invention, it is impossible to carry out the flow control for restricting the flow, which the preceding apparatus generates, per the priority class. Therefore, once the flow control is carried out, the flows, which belong to all of the priority classes and include particularly the flow which has no necessity to be restricted, are objects of the restriction, and consequently QoS becomes degraded as a whole.

According to the exemplary embodiment, the flow control flag corresponding to the low priority class is set OFF in this case, and even if the packet storing part 321, which stores the low priority class packet, enters into the state of congestion, the flow control is not carried out to the flow belonging to the low priority class.

Moreover, in the case that the transmission speed on the inter-apparatus line is 60 Mbps, the flow control flags corresponding to both the medium priority class and the low priority class are set OFF. In this case, no influence is caused to the high priority class bandwidth which is occupied individually.

On the other hand, in the case that a flow control flag corresponding to a certain priority class is set ON, the flow control is carried out when the packet storing part 321, which stores a packet belonging to the priority class, enters into the state of congestion, so that the packet may not be discarded. Accordingly, the flow control flags corresponding to the medium priority class and the high priority class are set ON respectively in the case that the transmission speed on the inter-apparatus line is 100 Mbps, and the flow control flag corresponding to the high priority class is set ON in the case of 60 Mbps. In the case that the transmission speed is 30 Mbps, there is no bandwidth to which the flow control causes the influence even if the flow control is carried out. Accordingly, in the case that the transmission speed is 30 Mbps, the flow control flags corresponding to all the priority classes are set ON.

On the other hand, the flow control comprehensive-flag is used in the QoS information table 331 in the case that the bandwidth control information is set in the QoS information table 331 so that it may be unnecessary to control carrying out the flow control per the priority class. For example, according to the setting example shown in FIG. 10, there is no other bandwidths, on which to carry out the flow control causes the influence, in the case of any transmission speed. Therefore, the flow control comprehensive-flag, which is set ON, is used instead of setting the flow control flags, which are corresponding to all the priority classes, ON.

Next, a control operation for carrying out the flow control in the network repeater according to the third exemplary embodiment will be described with reference to FIGS. 11, 12 and 13.

Figure 11:
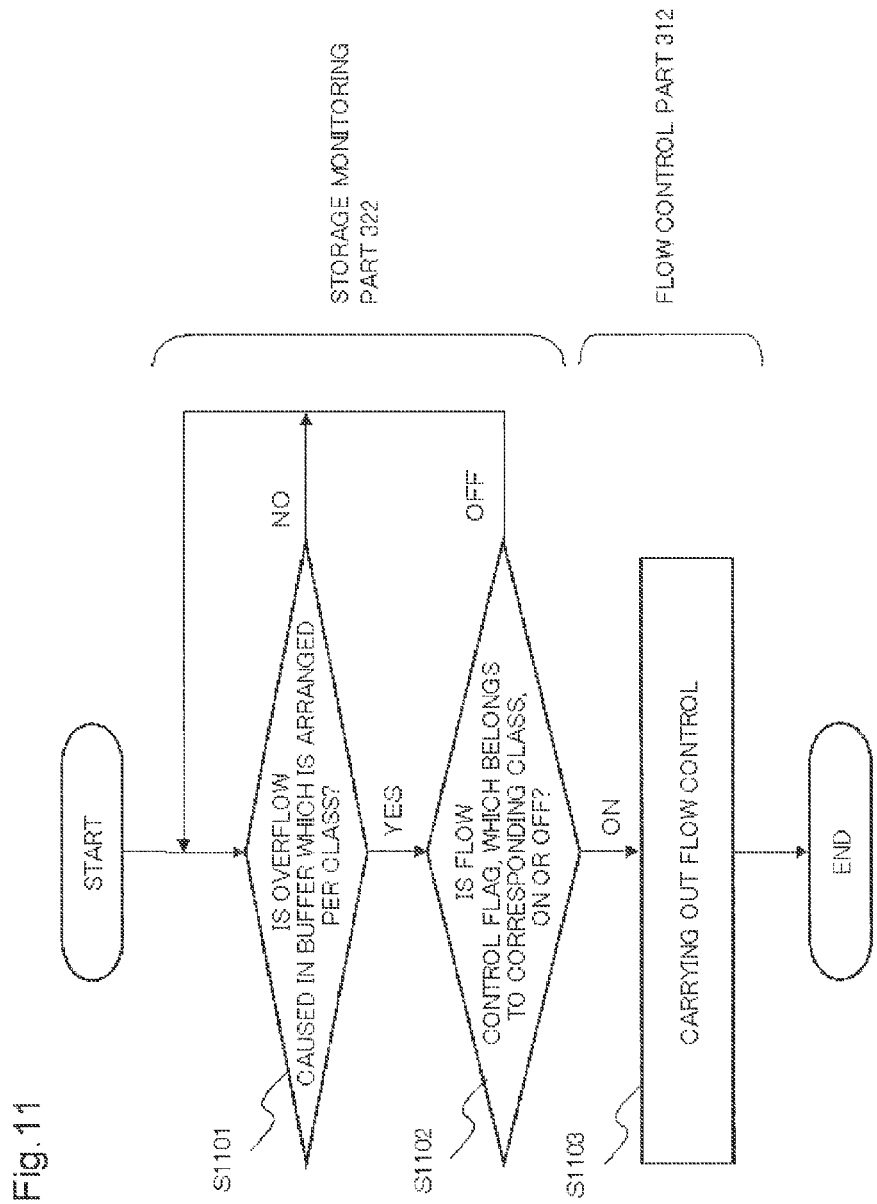
[FIG. 11] is a flowchart explaining an operation of flow control carried out in the network repeater according to the third exemplary embodiment.

FIG. 11 is a flowchart explaining the operation of the flow control carried out in the network repeater according to the third exemplary embodiment.

When the storage monitoring part 322 detects that the packet storing part 321, which is arranged per the priority class, enters into the state of congestion (YES in S1101), the storage monitoring part 322 checks the setting of the corresponding flow control flag per the priority class (S1102). In the case that the corresponding priority flow control flag per the priority class is set OFF, the storage monitoring unit 322 returns to monitoring the packet storing part 321 without outputting the congestion information (OFF in S1102). On the other hand, in the case that the corresponding priority flow control flag per the priority class is set ON, the storage monitoring unit 322 outputs the congestion information to the flow control part 312 (ON in S1102). The flow control part 312 which receives the congestion information carries out the flow control (S1103).

Here, if the flow control flag is the flow control comprehensive-flag in the above-mentioned case, the storage monitoring part 322 judges whether it is necessary or not to output the congestion information to the flow control part 312 according to the setting of the flow control comprehensive-flag with no relation to the priority class.

Figure 12:
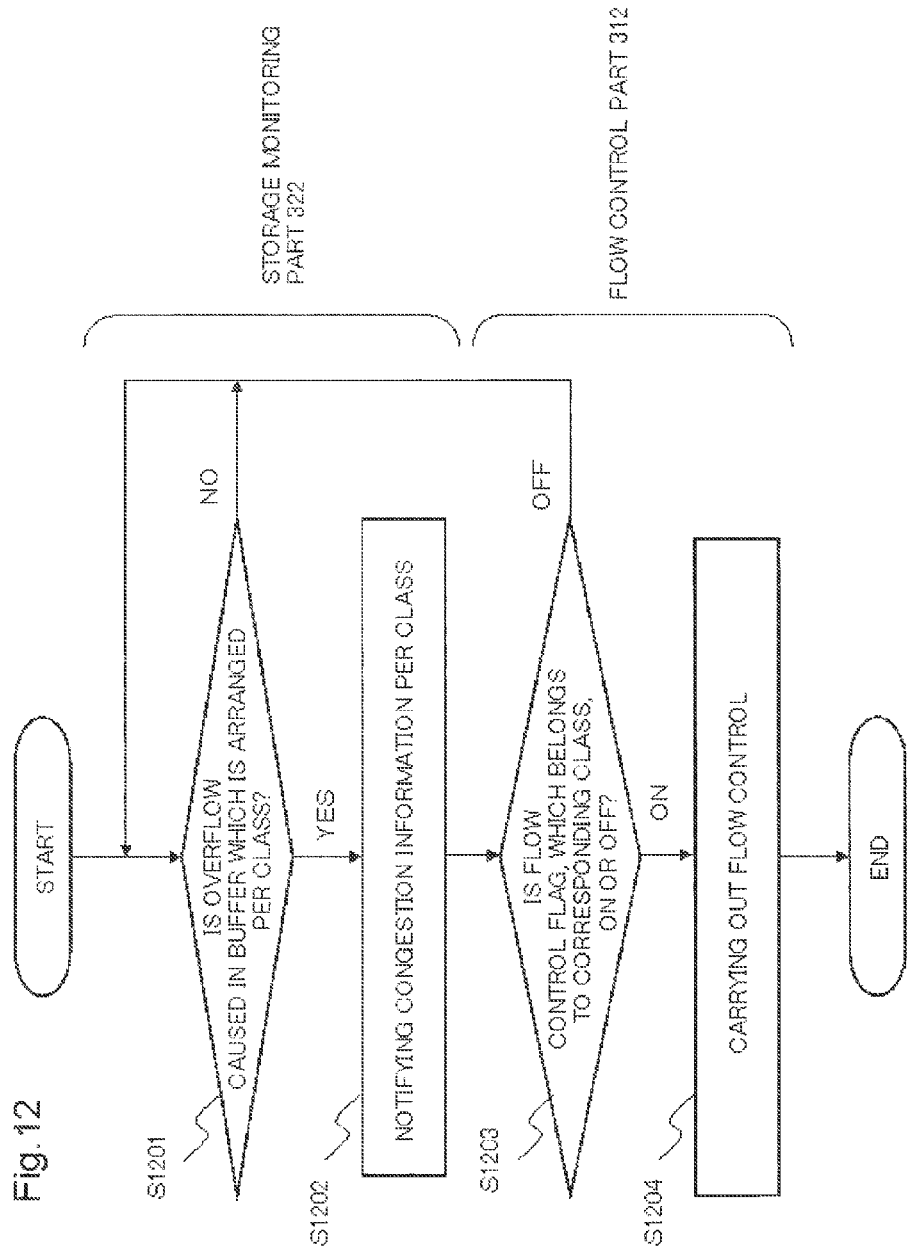
[FIG. 12] is a flowchart explaining an operation of another flow control carried out in the network repeater according to the third exemplary embodiment.

FIG. 12 is a flowchart explaining an operation of another flow control carried out in the network repeater according to the third exemplary embodiment. The example shows an operation carried out in the case that the flow control part 312 holds the flow control flag.

According to the description on the configuration of the network repeater of the third exemplary embodiment mentioned above, the storage monitoring part 322 has the function to judge whether it is necessary or not to carry out the flow control according to the state of the flow control flag. However, it may be preferable that the flow control part 312 has the function to judge whether it is necessary or not to carry out the flow control according to the state of the flow control flag. In this case, the QoS control unit 330 transfers the flow control flag, which the QoS control unit 330 reads from the QoS information table 331, to the flow control part 312. The flow control part 312 holds the received flow control flag as the parameter information. When the stagnant state of the queue, which the storage monitoring part 322 monitors, reaches the predetermined value, the storage monitoring part 322 outputs the congestion information, which indicates that the corresponding packet storing part 321 is in the state of congestion, to the flow control part 312. At this time, the congestion information, of which the storage monitoring part 322 notifies, includes information which can identify the corresponding priority class.

An operation shown in FIG. 12, which is carried out on an assumption of the above-mentioned configuration, will be described in the following.

When the storage monitoring part 322 detects that the packet storing part 321, which is arranged per the priority class, enters into the state of congestion (YES in S1201), the storage monitoring part 322 outputs the congestion information together with the information, which identifies the priority class of the packet storing part 321 entering into the state of congestion, to the flow control part 312 (S1202). When the flow control part 312 receives the congestion information per the priority class, the flow control part 312 checks the setting of the flow control flag corresponding to the priority class (S1203). In the case that the corresponding flow control flag per the priority class is set OFF, the flow control part 312 does not carry out the flow control (OFF in S1203). On the other hand, in the case that the corresponding flow control flag per the priority class is set ON (ON in S1203), the flow control part 312 carries out the flow control (S1204).

Figure 13:
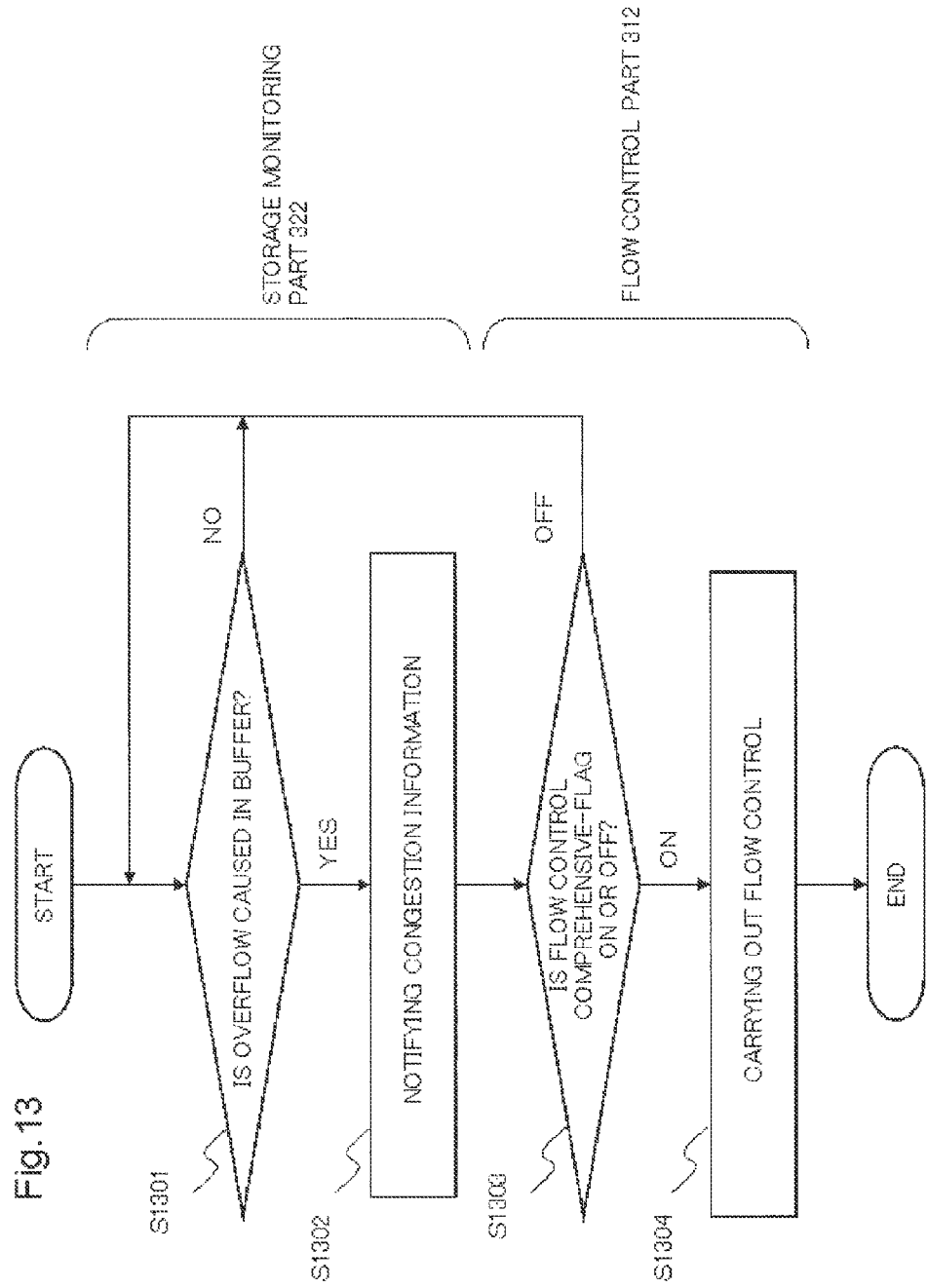
[FIG. 13] is a flowchart explaining an operation of furthermore-different flow control carried out in the network repeater according to the third exemplary embodiment.

FIG. 13 is a flowchart explaining an operation of furthermore different flow control carried out in the network repeater according to the third exemplary embodiment. This example shows the operation which is carried out when the flow control part 312 holds the flow control flag similarly to the composition described in FIG. 12. Moreover, the flow control flag, which is used in this case, is the flow control comprehensive-flag.

When the storage monitoring part 322 detects that any packet storing part 321 enters into the state of congestion (YES in S1301), the storage monitoring part 322 outputs the congestion information to the flow control part 312 (S1302). When the flow control part 312 receives the congestion information, the flow control part 312 checks the setting of the flow control comprehensive-flag (S1303). In the case that the flow control comprehensive-flag is set OFF, the flow control part 312 does not carry out the flow control (OFF in S1303). On the other hand, in the case that the flow control comprehen-sive-flag is set ON (ON in S1303), the flow control part 312 carries out the flow control (S1304).

The network repeater of the third exemplary embodiment tracks the change in the transmission speed on the inter-apparatus line, and it is possible for the network repeater of the third exemplary embodiment to carry out the QoS control on the basis of the bandwidth control information on the outward line and the flow control flag which are determined in advance, corresponding to the changed state. Therefore, through predetermining the bandwidth control information on the outward line, and the flow control flag correspondingly to the anticipated change in the state of the inter-apparatus line, it is possible to carry out the optimum QoS control which the network designer intends. Moreover, the network repeater according to the third exemplary embodiment includes the flow control flag which can instructs whether it is possible or not to carry out the flow control per the priority class, and can control carrying out the flow control without causing the influence on the bandwidth which is occupied individually.

[Fourth Exemplary Embodiment]

Next, a network repeater according to a fourth exemplary embodiment will be described.

Also in the fourth exemplary embodiment, an inward line is, explained as a terminal line which is connected with a preceding apparatus not shown in the figure, and an outward line is explained as an inter-apparatus line which is connected with a following apparatus not shown in the figure.

The network repeater according to the fourth exemplary embodiment is used in an operation mode in which a transmission speed on the inter-apparatus line is changed on the basis of a predetermined plan. That is, the network repeater according to the fourth exemplary embodiment is used in an operation mode in which the transmission speed on the inter-apparatus line is changed according to a time zone on the basis of a network plan. As an example of the operation mode, the following operation is exemplified. That is, a whole day is divided to a daylight time zone, an evening to night time zone, and a mid night to early morning time zone, and then an operation is carried out so that a transmission speed and a ratio of bandwidths which are used in the bandwidth control may be changed in each time zone.

Figure 14:
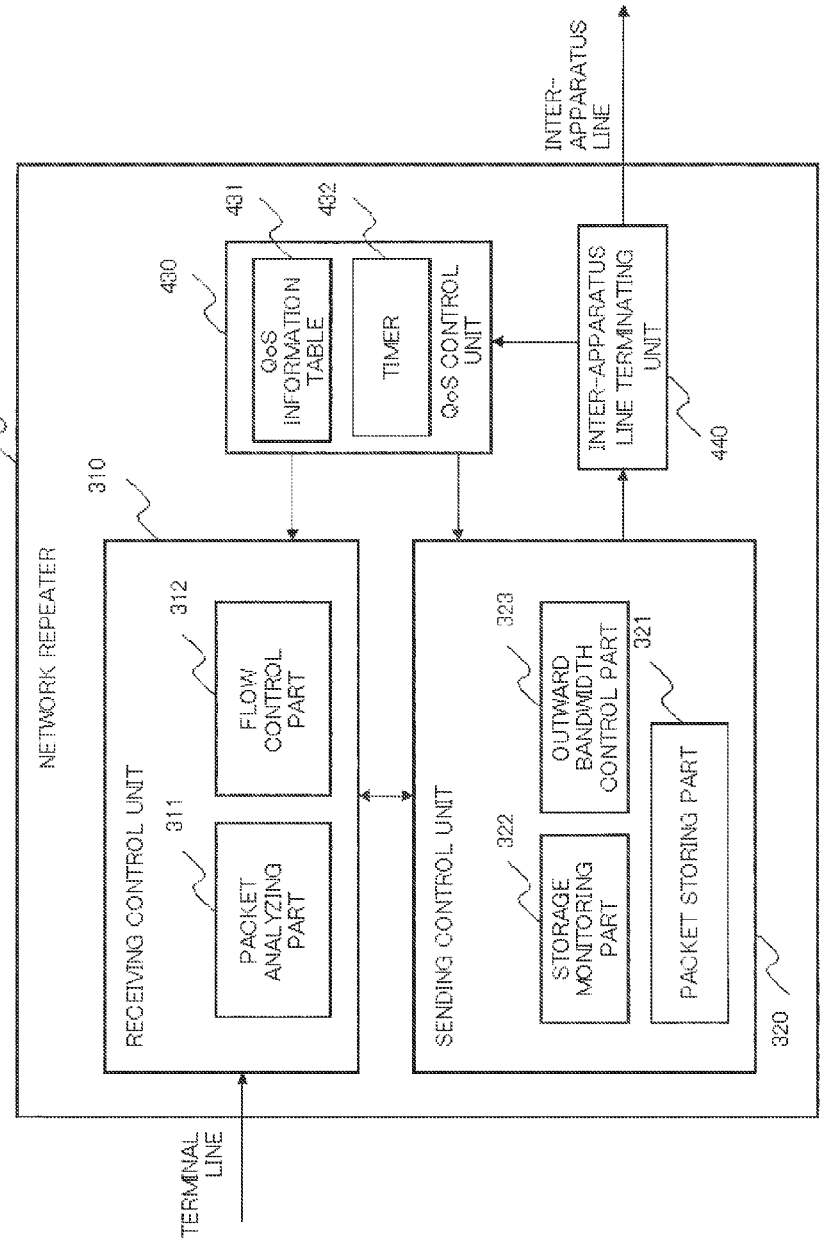
[FIG. 14] is a configuration block diagram showing a fourth exemplary embodiment of the network repeater according to the present invention.

FIG. 14 is a configuration block diagram showing the fourth exemplary embodiment of the network repeater according to the present invention.

In a network repeater 400 according to the fourth exemplary embodiment, the transmission speed on the inter-apparatus line is changed so that the transmission speed has a predetermined value in a predetermined time zone. Moreover, the network repeater 400 has a QoS control unit 430 including a QoS information table 431 storing a value of a parameter on QoS control which is set according to the predetermined transmission speed. Moreover, the QoS control unit 430 includes a timer 432 which clocks the present time.

The network repeater 400 according to the fourth exemplary embodiment includes furthermore the receiving control unit 310, the sending control unit 320 and an inter-apparatus line terminating unit 440 as other components. The receiving control unit 310 and the sending control unit 320 have the same configurations and the same functions those of the receiving control unit 310 and the sending control unit 320 respectively which the network repeater 300 according to the third exemplary embodiment includes. Therefore, reference codes, which are assigned to these components, are the same as the reference codes which are used in the network repeater 300 according to the third exemplary embodiment.

The receiving control unit 310 includes the packet analyzing part 311 and the flow control part 312. The packet analyzing part 311 analyzes a packet which is received through the terminal line, and then identifies a priority class of the packet. The flow control part 312 carries out flow control for restricting a data flow which flows into the network repeater 300.

The sending control unit 320 includes the packet storing part 321, the storage monitoring part 322 and the outward bandwidth control part 323. The packet storing part 321 stores the packet, which waits for being outputted, per the priority class. The storage monitoring part 322 has a function to monitor a stagnant state of the packets in the packet storing part 321, and to judge whether it is necessary or not to carry out the flow control.

Here, the flow control part 312 carries out the flow control on the basis of congestion information which the storage monitoring part 322 outputs.

The outward bandwidth control part 323 makes the packet storing part 321 output the packet to the inter-apparatus line terminating unit 440 on the basis of outward bandwidth control information, and controls a bandwidth of the inter-apparatus line per the priority class.

It may be preferable that the inter-apparatus line terminating unit 440 has a configuration of monitoring the transmission speed on the inter-apparatus line and outputting change information when the transmission speed is changed, similarly to the inter-apparatus line terminating unit 340 which is included in the network repeater 300 according to the third exemplary embodiment. Moreover, it may be preferable that the inter-apparatus line terminating unit 440 has a configuration of not monitoring the transmission speed on the inter-apparatus line.

An operation of updating a QoS setting parameter in the network repeater according to the fourth exemplary embodiment will be described with reference to FIG. 15.

Figure 15:
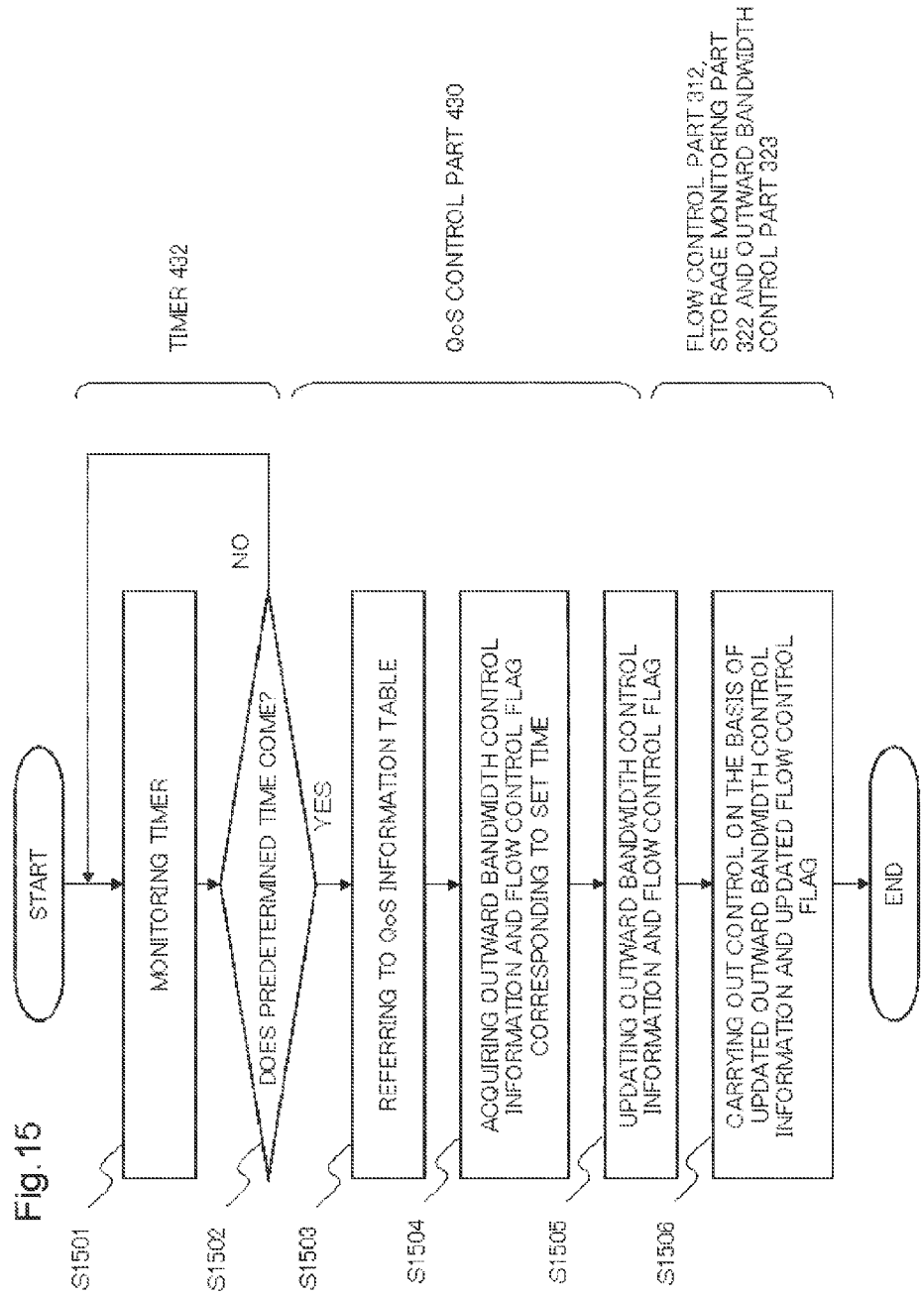
[FIG. 15] is a flowchart explaining an operation of updating a QoS setting parameter in the network repeater according to the fourth exemplary embodiment.

FIG. 15 is a flowchart explaining the operation of updating the QoS setting parameter in the network repeater according to the fourth exemplary embodiment.

The timer 432 of the QoS control unit 430 clocks the present time (S1501). When a predetermined time comes (YES in S1502), the QoS control unit 430 refers to the QoS information table 431 (S1503).

The QoS control unit 430 acquires QoS parameter information which is set in the QoS information table 431 correspondingly to the predetermined time (S1504). The QoS parameter information according to the fourth exemplary embodiment is the same as one according to the third exemplary embodiment and includes the outward bandwidth control information and the flow control flag (S1504).

The acquired outward bandwidth control information is transferred to the outward bandwidth control part 323 to update the QoS parameter which the outward bandwidth control part 323 holds (S1505). Moreover, the acquired flow control flag is transferred to the storage monitoring part 322 to update the QoS parameter information which the storage monitoring part 322 holds (S1505).

The outward bandwidth control part 323 updates the parameter information by use of the outward bandwidth control information which is transferred by the QoS control unit 430, and carries out the bandwidth control for the inter-apparatus line on the basis of the updated parameter information (S1506).

Moreover, the storage monitoring part 322 updates the parameter information by use of the flow control flag per the priority class which is transferred by the QoS control unit 430, and controls outputting the congestion information on the basis of the updated parameter information (S1506). The flow control part 312 carries out the flow control on the basis of the congestion information which the storage monitoring part 322 outputs.

Next, a specific example of the QoS information table 431 will be described.

Figure 16:
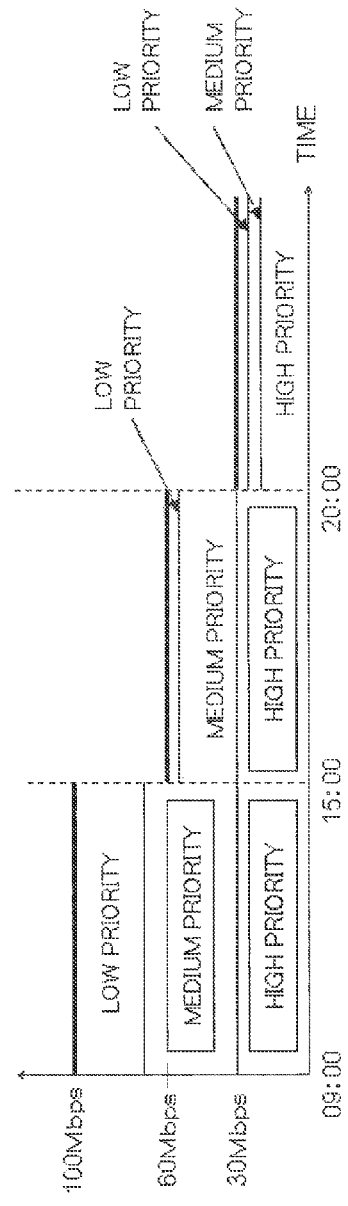
[FIG. 16] shows a setting example of a QoS information table of the network repeater according to the fourth exemplary embodiment.

FIG. 16 shows a setting example of the parameter which is set in the QoS information table 431 of the network repeater 400 according to the fourth exemplary embodiment. The QoS parameter information, which is set in the QoS information table 431, includes the outward bandwidth control information and the flow control flag.

FIG. 16(a) shows an example of the transmission speed on the inter-apparatus line (effective bandwidth) per the time zone, and the QoS parameter information which is set correspondingly to the transmission speed in each time zone. The transmission speed on the inter-apparatus line, is 100 Mbps from 9:00 to 15:00, 60 Mbps from 15:00 to 20:00, and 30 Mbps from 20:00 to 9:00 of the next day.

Moreover, the QoS parameter information, which is set correspondingly to the transmission speed in each time zone, shows a situation that the bandwidth control per the priority class for the inter-apparatus line in each time zone is carried out by use of the following setting.

In the time zone from 9:00 to 15:00, the flows belonging to the high priority class and the medium priority class occupy the bandwidths of 30 Mbps and 40 Mbps, respectively to use the bandwidths. In the time zone from 15:00 to 20:00, the flow belonging to the high priority class occupies the bandwidth of 30 Mbps to use the bandwidth, and the flows belonging to the medium priority class and the low priority class use 80% and 20%, respectively of the residual bandwidth. Moreover, in the time zone from 20:00 to 9:00 of the next day, the flows belonging to the high priority class, the medium priority class and the low priority class use 70%, 15% and 20%, respectively of a whole of the bandwidth.

That is, when the time 9:00 comes, the QoS parameter information corresponding to the time zone of "09:00 to 15:00" is read from the QoS information table 431. In this case, the transmission speed on the inter-apparatus line is 100 Mbps, and the bandwidth control is carried out so that the flows belonging to the high priority class and the medium priority class may occupy the bandwidths of 30 Mbps and 40 Mbps, respectively, and the flow belonging to the low priority class may use the residual bandwidth. When the time 15:00 comes, the QoS parameter information corresponding to the time zone of "15:00 to 20:00" is read from the QoS information table 431. In this case, the transmission speed on the inter-apparatus line is 60Mbps, and the bandwidth control is carried out so that the flow belonging to the high priority class may occupy the bandwidth of 30 Mbps and the flows belonging to the medium priority class and the low priority class may use 80% and 20%, respectively of the residual bandwidth. Moreover, when the time 20:00 comes, the QoS parameter information corresponding to the time zone of "20:00 to 09:00" is read from the QoS information table 431. In this case, the transmission speed on the inter-apparatus line is 30 Mbps, and the bandwidth control is carried out so that the flows belonging to the high priority class, the medium priority class and the low priority class may use 70%, 15% and 15% of the effective bandwidth of 30 Mbps.

Here, FIG. 16(b) shows schematically a state of occupying the bandwidth of the inter-apparatus line per the priority class in the case of carrying out the bandwidth control by use of the parameter which is set as mentioned above.

"ON/OFF" shown in FIG. 16(a) is a value which is set to the flow control flag per the priority class described in the third exemplary embodiment. Since the flow control flag per the priority class, and the configuration and the operation, which use the flow control flag per the priority class, are the same as those described in the third exemplary embodiment, description on the flow control flag per the priority class, the configuration and the operation is omitted.

Here, it is needless to say that, also in the network repeater according to the fourth exemplary embodiment, it is possible to set the parameter for carrying out the bandwidth control in an operation mode which is the same as the operation mode described in the network repeater according to the third exemplary embodiment with reference to FIG. 10.

As described above, the network repeater according to the fourth exemplary embodiment is used in the operation mode that the transmission speed on the inter-apparatus line is changed according to the time zone on the basis of the plan. When the predetermined time comes, the parameter information on the QoS control, which is corresponding to the time zone, is read from the QoS information table 431, and the bandwidth control and the flow control, which are corresponding to the read parameter information, are carried out. Therefore, it is possible to operate the inter-apparatus line effectively through adapting to the data flow in each time zone, and to carry out the optimum QoS control through tracking the data flow in each time zone. Moreover, the network repeater according to the fourth exemplary embodiment has the flow control flag which can instruct per the priority class whether it is possible or not to carry out the flow control, and can control carrying out the flow control without causing the influence on the bandwidth which is occupied individually.

A modified example of the network repeater according to the fourth exemplary embodiment will be described.

While the timer 432 is mounted on the QoS control unit 430 in order to clock the predetermined time according to the above description, it may be preferable that the timer 432 is not mounted on the QoS control unit 430.

In the case, it may be preferable that the inter-apparatus line terminating unit 440 manages time information in cooperation with a transmission apparatus which is not shown in the figure, and notifies the QoS control unit 430 of the time information corresponding to a time when the transmission speed is changed on the basis of setting by the transmission apparatus. That is, when the transmission speed of the transmission apparatus is changed at a certain time which is set in advance, the inter-apparatus line terminating unit 440 identifies the changed transmission speed, and notifies the QoS control unit 430 of the time information which indicates the time when the changed transmission speed is identified. It may be preferable that the time information is the time when the changed transmission speed is identified, or it may be preferable that the time information is time zone information indicating a time zone into which the time is converted.

Even if the QoS control unit 430 receives the notice from the inter-apparatus line terminating unit 440, the QoS control unit 430 carries out a process of S1503 and S1504 shown in FIG. 15, and the outward bandwidth control part 323 and the storage monitoring part 322 update the QoS parameter information in a process of S1505.

According to the modified example of the network repeater of the fourth exemplary embodiment, it is unnecessary to mount the timer 432 on the QoS control unit 430. The time information, of which the inter-apparatus line terminating unit 440 notifies the QoS control part 430, includes a time corresponding to the time when the transmission speed is changed on the basis of the setting by the transmission apparatus, and the time zone information indicating the time zone into which the time is converted. Therefore, it is possible to carry out the accurate control through tracking the actual change in the transmission speed.

As another modified example, it may be preferable that, when a transmission speed of the transmission apparatus is changed at the predetermined time, the inter-apparatus line terminating unit 440 identifies the changed transmission speed, and notifies the QoS control unit 430 of the identified transmission speed together with the time information. That is, the inter-apparatus line terminating unit 440 notifies the QoS control unit 430 of transmission speed information together with the identified time information.

Figure 17:
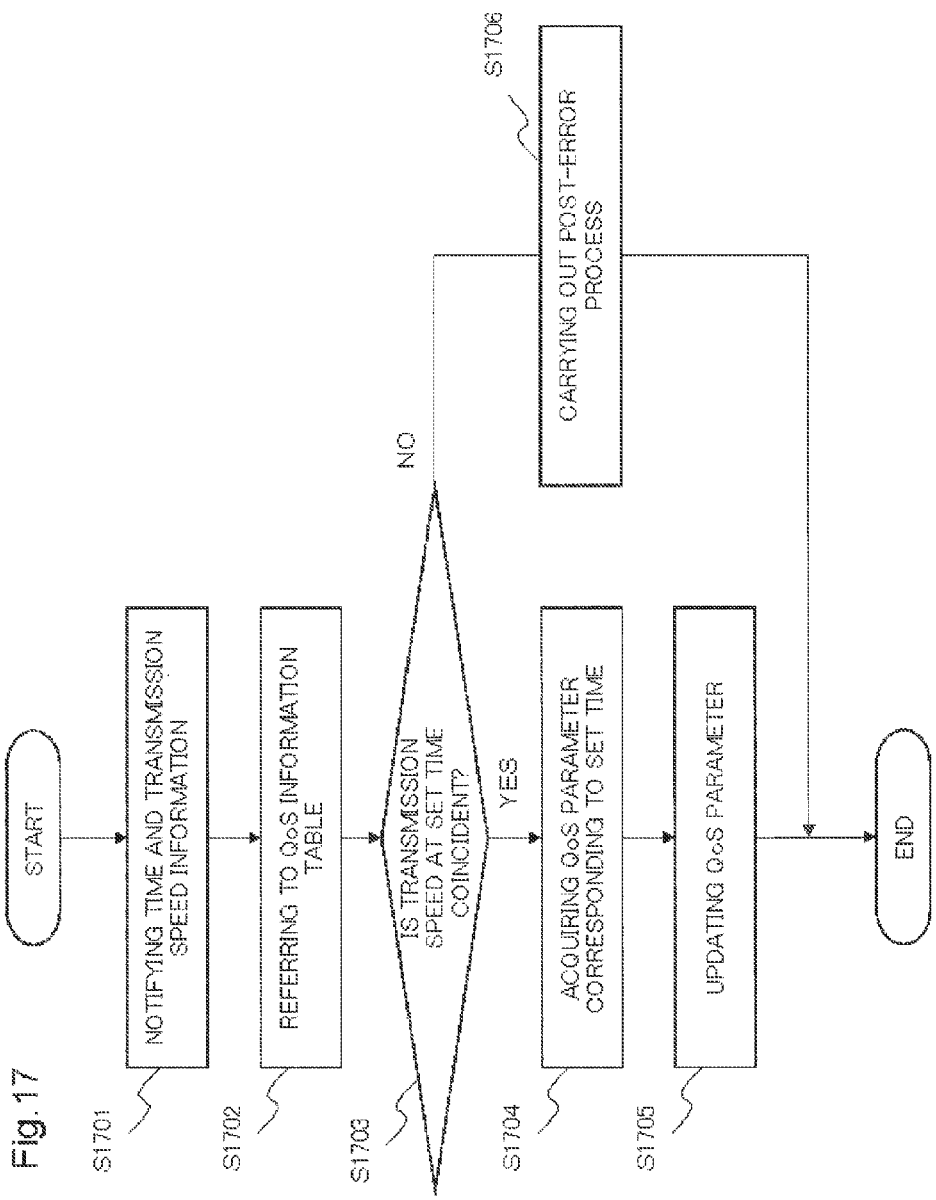
[FIG. 17] shows a setting example of a QoS information table in a modified example of the network repeater according to the fourth exemplary embodiment.

In the case that the above-mentioned configuration is adopted, it is possible that the QoS control unit 430 carries out comparison and check of the transmission speed which is set in QoS information table 431 correspondingly to the time information and which is included in the QoS parameter information. That is, in the case that the transmission speed on the inter-apparatus line is not changed to an expected transmission speed due to some failures, it is possible to carry out a post-error process without updating the QoS parameter information. FIG. 17 is a flowchart showing an operation of setting the QoS information table in consideration of the above-mentioned situation.

According to FIG. 17, the QoS control unit 430 receives the notice on the transmission speed information together with the time information from the inter-apparatus line terminating unit 440 (S1701). The QoS control unit 430 refers to the QoS information table 431 (S1702). At this time, the QoS control unit 430 reads the transmission speed information which is set in QoS information table 431 correspondingly to the time zone. Then, the QoS control unit 430 carries out the comparison and the check of the read transmission speed information with the transmission speed information of which the inter-apparatus line terminating unit 440 notifies the QoS control 430 (S1703).

In the case that both of the transmission speeds are coincident each other (YES in S1703), the QoS control unit 430 acquires the QoS parameter information which is set in QoS information table 431 correspondingly to the time (S1704). Then, the QoS control unit 430 transfers the acquired QoS parameter information to the outward bandwidth control part 323 and the storage monitoring part 322 to update the QoS parameter information (S1705).

In the case that both the transmission speeds are not coincident each other as a result of the comparison and the check in S1703 (NO in S1703), the QoS control unit 430 finishes the operation after carrying out the post-error process (S1706). That is, from a view point that the transmission speed information which is set in the QoS information table, and the transmission speed information, of which the inter-apparatus line terminating unit 440 notifies the QoS control unit 430, are not coincident each other, it is conceivable that a failure of the transmission apparatus or a setting error in the QoS information table 431 is caused. Therefore, the post-error process of notifying a user or the like of an abnormal state is carried out.

According to the other modified example of the network repeater of the fourth exemplary embodiment, the QoS parameter information is updated after it is checked whether the transmission speed on the inter-apparatus line is changed to the expected transmission speed. Therefore, it is possible to prevent the QoS parameter information from being updated improperly due to the failure of the transmission apparatus or the setting error in the QoS information table.

[Fifth Exemplary Embodiment]

A fifth exemplary embodiment of a network repeater according to the present invention will be described in the following.

Figure 18:
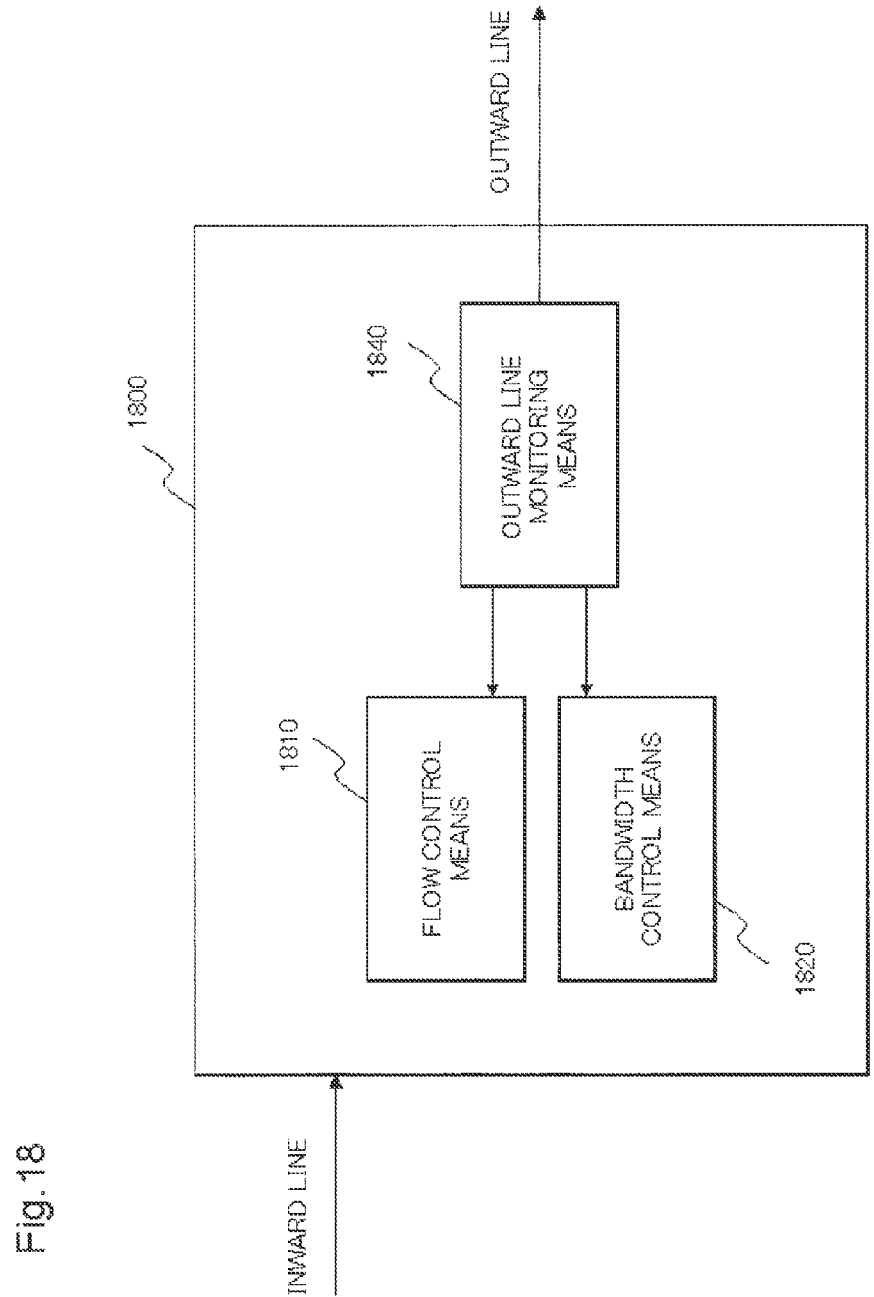
[FIG. 18] is a configuration block diagram showing a fifth exemplary embodiment of the network repeater according to the present invention.

FIG. 18 is a configuration block diagram showing the fifth exemplary embodiment of the network repeater according to the present invention. A configuration of a network repeater 1800 according to the fifth exemplary embodiment will be described with reference to FIG. 18.

As shown in FIG. 18, the network repeater 1800 according to the fifth exemplary embodiment includes a flow control means 1810, a bandwidth control means 1820 and an outward line monitoring means 1840.

The flow control means 1810 carries out flow control for restricting inflow of a data-flow which is received through an inward line. The bandwidth control means 1820 carries out bandwidth control of controlling a bandwidth of a data flow which is received through the inward line and is sent through an outward line. Moreover, the outward line monitoring means 1840 monitors a change in a state of the outward line.

In the case that the state of the outward line, which the outward line monitoring means 1840 monitors, satisfies a specified condition which is determined in advance, either the flow control means 1810 or the bandwidth control means 1820 carries out either the flow control or the bandwidth control on a condition corresponding to the specified condition.

Figure 19:
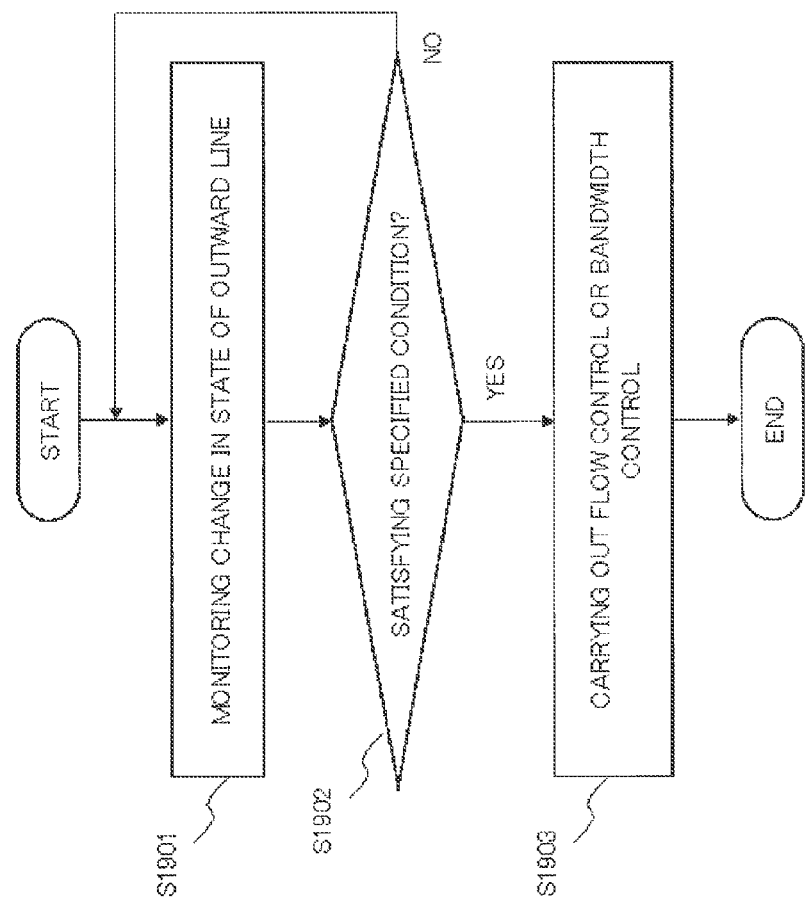
[FIG. 19] is a flowchart showing an operation carried out in the network repeater according to the fifth exemplary embodiment.

FIG. 19 is a flowchart explaining an operation carried out in the network repeater according to the fifth exemplary embodiment. The operation carried out in the network repeater 1800 according to the fifth exemplary embodiment will be described with reference to FIG. 19.

The outward line monitoring means 1840 monitors the state of the outward line (S1901). In the case that the state of the outward line, which the outward line monitoring means 1840 monitors, satisfies the specified condition which is determined in advance, the flow control means 1810 and the bandwidth control means 1820 carries out the operation described in S1903 (YES in S1902). Either the flow control means 1810 or the bandwidth control means 1820 carries out either the flow control or the bandwidth control on the condition corresponding to the specified condition (S1903).

According to the network repeater of the fifth exemplary embodiment which has the above-mentioned configuration, it is possible to track the change in the state of the outward line, and to carry out the flow control and the bandwidth control correspondingly to the changed state. Therefore, through carrying out the flow control and the bandwidth control which are corresponding to the anticipated change in the state of the outward line, it is possible to carry out the optimum QoS control which the network designer intends.

[Sixth Exemplary Embodiment]

A network repeater according to a sixth exemplary embodiment includes: a flow control means to carry out flow control for restricting inflow of a data flow which is received through an inward line; a bandwidth control means to carry out bandwidth control of controlling a bandwidth of a data flow which is received through the inward line and is sent through an outward line; a QoS control means to manage parameter information on QoS control which includes a process of receiving data through the inward line up to a process of sending data through the outward line; and an outward line monitoring means to monitor a change in a state of the outward line and to notify the QoS control means of specified condition information in the case that the monitored state of the outward line satisfies a specified condition. When the QoS control means acquires the specified condition information on the outward line from the outward line monitoring means, the QoS control means acquires the parameter information on the QoS control which is predetermined correspondingly to the specified condition indicated by the specified condition information, and transfers the acquired parameter information on the QoS control to the flow control means and the bandwidth control means. The flow control means controls carrying out the flow control on the basis of the parameter information on the QoS control which is transferred by the QoS control means, and the bandwidth control means carries out the bandwidth control, which the parameter information specifies, on the basis of the parameter information on the QoS control which is transferred by the QoS control means.

A QoS control method according to the sixth exemplary embodiment for a network repeater, which receives data through an inward line and sends the received data through an outward line, includes: monitoring a change in a state of the outward line; acquiring specified condition information in the case that the monitored state of the outward line satisfies a specified condition which is determined in advance; acquiring parameter information on QoS control which is predetermined correspondingly to the specified condition indicated by the specified condition information; and carrying out either flow control for restricting inflow of a data flow which is received through the inward line or bandwidth control of controlling a bandwidth of a data flow, which is received through the inward line and is sent through the outward line, on the basis of the acquired parameter information on the QoS control on a condition specified by the parameter information.

Here, it is possible to realize the function of the network repeater according to the exemplary embodiment mentioned above by use of hardware, and it is also possible to realize the function by use of a computer and a program which works on the computer. The program is recorded in a recording medium such as a magnetic disk and a semiconductor memory to be provided, and a computer reads the program when the computer is activated. Through controlling an operation carried out by the computer, and making the computer work as the network repeater according to each the above-mentioned embodiment, the process mentioned above is carried out.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-110920, filed on May 13, 2010, the disclosure of which is incorporated herein in its entirety by reference.

REFERENCE SIGNS LIST

10 Network repeater
20 Terminal
30 Network
100, 200, 300 and 400 Network repeater
110 Flow control means
120 Bandwidth control means
130 QoS control means
140 Outward line monitoring means
210, 310 Receiving control unit
220, 320 Transmission control unit
230, 330, 430 QoS control unit
240, 340, 440 Inter-apparatus line terminating unit
211, 311 Packet analyzing part
212 Inflow bandwidth restricting control part
312 Flow control part
221, 321 Packet storing part
222, 322 Storage monitoring part 323 Outward bandwidth control part
231, 331, 431 QoS information table
432 Timer

The invention claimed is:
1. A network repeater, comprising:
a flow controller configured to carry out flow control for restricting inflow of a data flow which is received through an inward line;
a bandwidth controller configured to carry out bandwidth control of controlling a bandwidth of a data flow which is received through the inward line and is sent through an outward line; and
an outward line monitor configured to monitor a change in a state of the outward line, wherein
in a case that the monitored state of the outward line satisfies a specified condition which is determined in advance, either the flow control or the bandwidth control is configured to be carried out on a condition corresponding to the specified condition, wherein
the outward line monitor is an inter-apparatus line terminating unit configured to monitor a transmission speed on an inter-apparatus line comprising a wireless line whose transmission speed is changed due to an external environment, and which, when the transmission speed on the inter-apparatus line is changed to a predetermined value, is configured to notify a Quality of Service (QoS) controller of changed transmission speed information, and wherein
the QoS controller comprises a QoS information table configured to store parameter information on QoS control which is predetermined correspondingly to the predetermined transmission speed on the inter-apparatus line, and to read the parameter information on the QoS control, which is predetermined correspondingly to the transmission speed indicated by the transmission speed information, from the QoS information table when receiving notice regarding the changed transmission speed information on the inter-apparatus line from the inter-apparatus line terminating unit.

2. The network repeater according to claim 1, wherein:
the QoS controller is further configured to manage the parameter information on QoS control which is related to a process of receiving data through the inward line up to a process of sending data through the outward line, and
wherein, when the QoS controller acquires specified condition information on the outward line from the outward line monitor, the QoS controller is configured to acquire the parameter information on the QoS control which is predetermined correspondingly to the specified condition indicated by the specified condition information, and to transfer the acquired parameter information on the QoS control to the flow controller and the bandwidth controller, wherein
the flow controller is configured to control carrying out the flow control on the basis of the parameter information on the QoS control, which is transferred by the QoS controller, and wherein the bandwidth controller is configured to carry out the bandwidth control, which is specified by the parameter information, on the basis of the parameter information on the QoS control which is transferred by the QoS controller.

3. A network repeater, comprising:
a flow controller configured to carry out flow control for restricting inflow of a data flow which is received through an inward line;
a bandwidth controller configured to carry out bandwidth control of controlling a bandwidth of a data flow which is received through the inward line and is sent through an outward line; and
an outward line monitor configured to monitor a change in a state of the outward line, wherein
in a case that the monitored state of the outward line satisfies a specified condition which is determined in advance, either the flow control or the bandwidth control is configured to be carried out on a condition corresponding to the specified condition;
the outward line monitor is an inter-apparatus line terminating unit configured to monitor a transmission speed on an inter-apparatus line comprising a wireless line whose transmission speed is changed due to an external environment, and to notify a Quality of Service (QoS) controller of transmission speed information on the inter-apparatus line, wherein
the QoS controller comprises a QoS information table configured to store parameter information on QoS control which is predetermined correspondingly to a predetermined transmission speed on the inter-apparatus line, and wherein
when the QoS controller detects that the transmission speed information, of which the inter-apparatus line terminating unit notifies, is changed to the predetermined transmission speed, the QoS controller is configured to read the parameter information on the QoS control, which is predetermined correspondingly to the changed transmission speed, from the QoS information table.

4. A network repeater comprising:
a flow controller configured to carry out flow control for restricting inflow of a data flow which is received through an inward line;
a bandwidth controller configured to carry out bandwidth control of controlling a bandwidth of a data flow which is received through the inward line and is sent through an outward line; and
an outward line monitor configured to monitor a change in a state of the outward line, wherein
in a case that the monitored state of the outward line satisfies a specified condition which is determined in advance, either the flow control or the bandwidth control is configured to be carried out on a condition corresponding to the specified condition;
a Quality of Service (QoS) controller comprising a QoS information table configured to store parameter information on QoS control which is predetermined correspondingly to a predetermined transmission speed, which is changed per a predetermined time zone, on an inter-apparatus line, and wherein
when the QoS controller is configured to detect a time corresponding to a time zone, the QoS controller is configured to read the parameter information on the QoS control, which is predetermined correspondingly to the predetermined transmission speed on the inter-apparatus line corresponding to the detected time zone, with reference to the QoS information table.

5. A network repeater, comprising:
a flow controller configured to carry out flow control for restricting inflow of a data flow which is received through an inward line;
a bandwidth controller configured to carry out bandwidth control of controlling a bandwidth of a data flow which is received through the inward line and is sent through an outward line; and an outward line monitor configured to monitor a change in a state of the outward line, wherein in a case that the monitored state of the outward line satisfies a specified condition which is determined in advance, either the flow control or the bandwidth control is configured to be carried out on a condition corresponding to the specified condition;

the outward line monitor is an inter-apparatus line terminating unit configured to monitor an inter-apparatus line whose transmission speed is changed per a predetermined time zone, and, when a time corresponding to the predetermined time zone comes, to notify a Quality of Service (QoS) controller of time information related to the time corresponding to the predetermined time zone, wherein the QoS controller comprises a QoS information table configured to store parameter information on QoS control which is predetermined correspondingly to the transmission speed on the inter-apparatus line in each of a plurality of time zones, and wherein when the QoS controller is configured to receive notice regarding time information from the inter-apparatus line terminating unit, the QoS controller is configured to read the parameter information on the QoS control, which is predetermined correspondingly to the transmission speed on the inter-apparatus line in the time zone indicated by the time information, with reference to the QoS information table.

6. The network repeater according to claim 5, wherein the inter-apparatus line terminating unit is configured to notify the QoS controller of transmission speed information indicating the transmission speed on the inter-apparatus line at the time, together with the time information, and wherein when the QoS controller receives the notice on the time information and the transmission speed information from the inter-apparatus line terminating unit, the QoS controller is configured to read the transmission speed on the inter-apparatus line in the time zone indicated by the time information with reference to the QoS information table, and to carry out a post-error process in a case where the read transmission speed is not coincident with the transmission speed indicated by the transmission speed information notified from the inter-apparatus line terminating unit.

7. A network repeater comprising:

a flow controller configured to carry out flow control for restricting inflow of a data flow which is received through an inward line;

a bandwidth controller configured to carry out bandwidth control of controlling a bandwidth of a data flow which is received through the inward line and is sent through an outward line; and an outward line monitor configured to monitor a change in a state of the outward line, wherein in a case that the monitered state of the outward line satisfies a specified condition which is determined in advance, either flow control or the bandwidth control is configured to be carried out on a condition corresponding to the specified condition;

the bandwidth controller is an outward bandwidth control unit which is configured to control a bandwidth of a transmitted data flow per a priority class within an effective bandwidth of the outward line, wherein the flow controller comprises a flow control unit which is configured to carry out the flow control, and a storage monitoring unit which is configured to monitor a state of congestion per the priority class in a packet storing unit arranged per the priority class, wherein parameter information regarding Quality of Service (QoS) control, which is managed by a QoS controller, comprises outward bandwidth control information which specifies a sending bandwidth of a data flow generated per the priority class and determined correspondingly to a transmission speed on the outward line, and a flow control flag which specifies whether it is permissible or not to carry out the flow control which is defined per the priority class correspondingly to the transmission speed on the outward line, and wherein even if the storage monitoring unit detects that the packet storing unit is in the state of congestion, when the flow control flag belonging to a corresponding priority class indicates that carrying out the flow control is not permissible, the flow control unit does not carry out the flow control.

8. A Quality of Service (QoS) control method for a network repeater which receives data through an inward line, and sends the received data through an outward line, comprising:

monitoring a change in a state of the outward line;

carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that a monitored state of the outward line satisfies the specified condition, wherein the monitoring a change in the state of the outward line comprising monitoring a transmission speed on an inter-apparatus line comprising a wireless line whose transmission speed is changed due to an external environment, and, when the transmission speed on the inter-apparatus line is changed to a predetermined value, notifies a QoS controller of changed transmission speed information, and storing parameter information regarding QoS control in a QoS information table of the QoS controller, the parameter information being predetermined correspondingly to the predetermined transmission speed on the inter-apparatus line, and reading the parameter information regarding the QoS control, which is predetermined correspondingly to the transmission speed indicated by the transmission speed information, from the QoS information table when receiving the notification of the changed transmission speed information.

9. A Quality of Service (QoS) control method for a network repeater which receives data through an inward line, and sends the received data through an outward line, comprising:

monitoring a change in a state of the outward line;

carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;

the monitoring a change in a state of the outward line comprising monitoring a transmission speed on an inter-apparatus line comprising a wireless line whose transmission speed is changed due to an external environment, and notifying a QoS controller of transmission speed information on the inter-apparatus line;

storing, by the QoS controller in a QoS information table of the QoS controller, parameter information on QoS control which is predetermined correspondingly to a predetermined transmission speed on the inter-apparatus line; and when the QoS controller detects that the transmission speed information, of which the inter-apparatus line terminating unit notifies, is changed to the predetermined transmission speed, the QoS controller reads the parameter information on the QoS control, which is predetermined correspondingly to the changed transmission speed, from the QoS information table.

10. A Quality of Service (QoS) control method for a network repeater which receives data through an inward line, and sends the received data through an outward line, comprising:

monitoring a change in a state of the outward line;

carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;

storing, by a QoS controller in a QoS information table of the QoS controller, parameter information on QoS control which is predetermined correspondingly to a predetermined transmission speed, which is changed per a predetermined time zone, on the inter-apparatus line; and when the QoS controller detects a time corresponding to a time zone, the QoS controller reads the parameter information on the QoS control, which is predetermined correspondingly to the predetermined transmission speed on the inter-apparatus line corresponding to the detected time zone, with reference to the QoS information table.

11. A Quality of Service (QoS) control method for a network repeater which receives data through an inward line, and sends the received data through an outward line, comprising:

monitoring a change in a state of the outward line;

carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;

monitoring, by an outward line monitor as an inter-apparatus line terminating unit, an inter-apparatus line whose transmission speed is changed per a predetermined time zone, and, when a time corresponding to the predetermined time zone comes, notifying a QoS controller of time information related to the time corresponding to the predetermined time zone;

storing, in a QoS information table of the QoS controller, parameter information on QoS control which is predetermined correspondingly to the transmission speed on the inter-apparatus line in each of a plurality of time zones; and when the QoS controller receives the notification of the time information from the inter-apparatus line terminating unit, reading the parameter information on the QoS control, which is predetermined correspondingly to the transmission speed on the inter-apparatus line in the time zone indicated by the time information, with reference to the QoS information table.

12. A Quality of Service (QoS) control method for a network repeater which receives data through an inward line, and sends the received data through an outward line, comprising:

monitoring a change in a state of the outward line;

carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;

controlling, by the bandwidth controller as an outward bandwidth control unit, a bandwidth of a transmitted data flow per a priority class within an effective bandwidth of the outward line;

carrying out the flow control by a flow control unit of the flow controller, and monitoring, by a storage monitoring unit, a state of congestion per the priority class in a packet storing unit arranged per the priority class; and managing the parameter information regarding QoS control, comprising outward bandwidth control information specifying a sending bandwidth of a data flow generated per the priority class and determined correspondingly to a transmission speed on the outward line, and a flow control flag which specifies whether it is permissible or not to carry out the flow control which is defined per the priority class correspondingly to the transmission speed on the outward line; and when the flow control flag belonging to the corresponding priority class indicates that carrying out the flow control is not permissible, the flow control unit does not carry out the flow control, even if the storage monitoring unit detects that the packet storing unit arranged per the priority class is in the state of congestion.

13. A non-transitory storage medium storing a Quality of Service (QoS) control program which is used in a network repeater receiving data through an inward line and sending the received data through an outward line, which causes a computer to execute:

a process of monitoring a change in a state of the outward line;

a process of carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that a monitored state of the outward line satisfies the specified condition, wherein the process of monitoring a change in the state of the outward line comprising monitoring a transmission speed on an inter-apparatus line comprising a wireless line whose transmission speed is changed due to an external environment, and, when the transmission speed on the inter-apparatus line is changed to a predetermined value, notifies a QoS controller of changed transmission speed information, and a process of storing parameter information regarding QoS control in a QoS information table of the QoS controller, the parameter information being predetermined correspondingly to the predetermined transmission speed on the inter-apparatus line, and reading the parameter information regarding the QoS control, which is predetermined correspondingly to the transmission speed indicated by the transmission speed information, from the QoS information table when receiving the notification of the changed transmission speed information.

14. A non-transitory storage medium storing a Quality of Service (QoS) control program which is used in a network repeater receiving data through an inward line and sending the received data through an outward line, which causes a computer to execute: a process of monitoring a change in a state of the outward line;
a process of carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;
the process of monitoring a change in a state of the outward line comprising monitoring a transmission speed on an inter-apparatus line comprising a wireless line whose transmission speed is changed due to an external environment, and notifying a QoS controller of transmission speed information on the inter-apparatus line;
a process of storing, by the QoS controller in a QoS information table of the QoS controller, parameter information on QoS control which is predetermined correspondingly to a predetermined transmission speed on the inter-apparatus line; and
a process of, when the QoS controller detects that the transmission speed information, of which the inter-apparatus line terminating unit notifies, is changed to the predetermined transmission speed, the QoS controller reads the parameter information on the QoS control, which is predetermined correspondingly to the changed transmission speed, from the QoS information table.

15. A non-transitory storage medium storing a Quality of Service (QoS) control program which is used in a network repeater receiving data through an inward line and sending the received data through an outward line, which causes a computer to execute: a process of monitoring a change in a state of the outward line;
a process of carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;
a process of storing, by a QoS controller in a QoS information table of the QoS controller, parameter information on QoS control which is predetermined correspondingly to a predetermined transmission speed, which is changed per a predetermined time zone, on the inter-apparatus line; and
a process of, when the QoS controller detects a time corresponding to a time zone, the QoS controller reads the parameter information on the QoS control, which is predetermined correspondingly to the predetermined transmission speed on the inter-apparatus line corresponding to the detected time zone, with reference to the QoS information table.

16. A non-transitory storage medium storing a Quality of Service (QoS) control program which is used in a network repeater receiving data through an inward line and sending the received data through an outward line, which causes a computer to execute:
a process of monitoring a change in a state of the outward line;
a process of carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;
a process of monitoring, by an outward line monitor as an inter-apparatus line terminating unit, an inter-apparatus line whose transmission speed is changed per a predetermined time zone, and, when a time corresponding to the predetermined time zone comes, notifying a QoS controller of time information related to the time corresponding to the predetermined time zone;
a process of storing, in a QoS information table of the QoS controller, parameter information on QoS control which is predetermined correspondingly to the transmission speed on the inter-apparatus line in each of a plurality of time zones; and
a process of, when the QoS controller receives the notification of the time information from the inter-apparatus line terminating unit, reading the parameter information on the QoS control, which is predetermined correspondingly to the transmission speed on the inter-apparatus line in the time zone indicated by the time information, with reference to the QoS information table.

17. A non-transitory storage medium storing a Quality of Service (QoS) control program which is used in a network repeater receiving data through an inward line and sending the received data through an outward line, which causes a computer to execute: a process of monitoring a change in a state of the outward line;
a process of carrying out either flow control for restricting inflow of a data flow received through the inward line or bandwidth control of controlling a bandwidth of a data flow, which is received through the inward line and is sent through the outward line, on a condition corresponding to a specified condition, which is determined in advance, in a case that the monitored state of the outward line satisfies the specified condition;
a process of controlling, by the bandwidth controller as an outward bandwidth control unit, a bandwidth of a transmitted data flow per a priority class within an effective bandwidth of the outward line;
a process of carrying out the flow control by a flow control unit of the flow controller, and monitoring, by a storage monitoring unit, a state of congestion per the priority class in a packet storing unit arranged per the priority class; and
a process of managing the parameter information regarding QoS control, comprising outward bandwidth control information specifying a sending bandwidth of a data flow generated per the priority class and determined correspondingly to a transmission speed on the outward line, and a flow control flag which specifies whether it is permissible or not to carry out the flow control which is defined per the priority class correspondingly to the transmission speed on the outward line; and
a process of, when the flow control flag belonging to the corresponding priority class indicates that carrying out the flow control is not permissible, the flow control unit does not carry out the flow control, even if the storage monitoring unit detects that the packet storing unit arranged per the priority class is in the state of congestion.

* * * * *